United States Patent
Iwasaki et al.

(10) Patent No.: US 9,038,493 B2
(45) Date of Patent: May 26, 2015

(54) AUTOMATIC SHIFT DEVICE FOR AUTOMATED TRANSMISSION FOR VEHICLE

(71) Applicant: AISIN SEIKI KABUSHIKI KAISHA, Kariya-shi (JP)

(72) Inventors: Yasuhisa Iwasaki, Ichinomiya (JP); Kyosuke Mori, Kariya (JP); Yusuke Yoshida, Kitanagoya (JP); Keisuke Mishima, Takahama (JP); Masahiko Komura, Ichinomiya (JP)

(73) Assignee: AISIN SEIKI KABUSHIKI KAISHA, Kariya-shi (JP)

(*) Notice: Subject to any disclaimer, the term of this patent is extended or adjusted under 35 U.S.C. 154(b) by 0 days.

(21) Appl. No.: 14/219,129

(22) Filed: Mar. 19, 2014

(65) Prior Publication Data
US 2014/0283637 A1    Sep. 25, 2014

(30) Foreign Application Priority Data

Mar. 25, 2013  (JP) .................................. 2013-062491

(51) Int. Cl.
F16H 61/00 (2006.01)
F16D 11/04 (2006.01)
F16H 3/083 (2006.01)
F16D 11/10 (2006.01)
F16D 11/00 (2006.01)

(52) U.S. Cl.
CPC ............ *F16H 3/083* (2013.01); *Y10T 74/19251* (2015.01); *F16D 11/10* (2013.01); *F16D 2011/008* (2013.01)

(58) Field of Classification Search
USPC .......... 74/335, 336 R, 339; 192/53.31, 53.32, 192/53.33, 53.34
See application file for complete search history.

(56) References Cited

U.S. PATENT DOCUMENTS

| 5,022,506 | A  | * | 6/1991  | Philippe ..................... 192/53.32 |
| 5,038,884 | A  | * | 8/1991  | Hamada et al. ............... 180/233 |
| 6,672,180 | B2 | * | 1/2004  | Forsyth .......................... 74/339 |
| 6,679,133 | B1 | * | 1/2004  | Kayano et al. .................. 74/335 |
| 7,150,698 | B2 | * | 12/2006 | Sakamoto et al. ................ 477/5 |
| 7,665,376 | B2 | * | 2/2010  | Forsyth .......................... 74/330 |

FOREIGN PATENT DOCUMENTS

JP    3709955    10/2005

OTHER PUBLICATIONS

U.S. Appl. No. 14/220,517, filed Mar. 20, 2014, Iwasaki, et al.

* cited by examiner

*Primary Examiner* — Ha D Ho
(74) *Attorney, Agent, or Firm* — Oblon, McClelland, Maier & Neustadt, L.L.P.

(57) ABSTRACT

An automatic shift device for an automated transmission for a vehicle includes a rotation shaft, a clutch ring, a clutch hub, a sleeve, a dog clutch portion, a shaft moving apparatus, and a control portion. The control portion includes a push force reduction control portion performing a push force reduction control reducing a push force of the sleeve that the shaft moving apparatus applies on the clutch rear teeth in response to a back and forth movement of the sleeve after the sleeve reaches an end surface of the clutch rear tooth. The control portion includes a retry control portion performing a retry control that re-applies the push force of the sleeve in response to a predetermined retry condition after the push force reduction control is performed.

13 Claims, 11 Drawing Sheets

AUTOMATIC SHIFT DEVICE FOR AUTOMATED TRANSMISSION FOR VEHICLE

CROSS REFERENCE TO RELATED APPLICATIONS

This application is based on and claims priority under 35 U.S.C. §119 to Japanese Patent Application 2013-062491, filed on Mar. 25, 2013, the entire content of which is incorporated herein by reference.

TECHNICAL FIELD

This disclosure generally relates to an automatic shift device for an automated transmission for a vehicle.

BACKGROUND DISCUSSION

An automatic shift device automatically shifting the gear stages of an automated transmission by a control unit, which is an ECU, actuating a driving motor is known. For example, in a technology disclosed in JP3709955B, hereinafter referred to as Reference 1, an ECU actuates a driving motor of an automatic shift device and moves a sleeve, which is connected to the driving motor and in rotary engagement with an input shaft, in an axial direction of the input shaft with a predetermined torque, when shifting a gear stage. The protruding portion of a dowel provided on the sleeve engages with the recessed portion of the dowel provided on a gear that is idly rotatably supported by the input shaft so as to integrally rotate the sleeve and the gear. Accordingly, rotational driving power is transmitted to an output shaft that is in rotary engagement with the gear. In the above case, a synchronizer mechanism is not used on bringing the sleeve and the gear into rotary engagement. As a result, the sleeve and the gear are not smoothly engaged every time. In other words, there may be a case where the protruding portion of the dowel provided on the sleeve is not engaged with the recessed portion of the dowel provided on the gear. An end portion of the protruding portion of the dowel may contact the flat surface of a protrusion at a position between the protruding portion of the dowel and the recessed portion of the dowel so that the protruding portion of the dowel and the recessed portion of the dowel synchronously rotate or slide on each other while rotating relative to each other. In the technology disclosed in Reference 1, as a countermeasure for such case, the rotation angle of the driving motor, which in other words is the operation stroke of the sleeve, is detected first, after the driving motor is actuated. In a case where the detected operation stroke is a stroke that is unlikely to reach a predetermined stroke that corresponds to the stroke at a time at which the sleeve is completely engaged with the gear, the sleeve and the gear are determined as not in an engaged state so that a re-entry control, or a retry control, is performed. The re-entry control is a control that temporarily reduces a torque applied from the driving motor for moving the sleeve so that the sleeve and the gear rotate relative to each other, and then retries entry of the sleeve into the recessed portion of the dowel by re-applying the predetermined torque on the sleeve. At the moment the protruding portion of the dowel and the recessed portion of the dowel come to the same phase, the predetermined torque is re-applied on the sleeve to move the sleeve so as to make the protruding portion of the dowel enter the recessed portion of the dowel. As a result, the sleeve and the gear are engaged with each other and are made to integrally rotate.

In the automatic shift device disclosed in Reference 1, a determination that the sleeve and the gear are not in an engaged state, which in other words is a determination that that the stroke of the sleeve is unlikely to reach a predetermined stroke that corresponds to the stroke at a time at which the sleeve is completely engaged with the gear, is determined with a timer and determined by whether or not a predetermined estimated time has elapsed. The predetermined estimated time is required to be defined at a length of time equal to or longer than the length of time required by the sleeve to smoothly reach the predetermined stroke. As a result, a lengthy time is required to determine that the sleeve and the gear are not engaged and a total shift time becomes long.

A need thus exists for an automatic shift device for an automated transmission for a vehicle, which is not susceptible to the drawbacks mentioned above.

SUMMARY

An automatic shift device for an automated transmission for a vehicle includes a rotation shaft configured to be in rotary engagement with and axially supported to be rotatable about an axis of one of an input shaft and an output shaft of the automated transmission, a clutch ring axially supported to be rotatable about the rotation shaft and configured to be in rotary engagement with the other one of the input shaft and the output shaft, a clutch hub fixed on the rotation shaft at a position adjacent to the clutch ring, a sleeve fitted to the clutch hub to be movable in an axial direction of the rotation shaft, a dog clutch portion protrudingly arranged on the clutch ring to protrude toward the sleeve, the dog clutch portion selectively meshing with the sleeve in response to movement of the sleeve in the axial direction, a shaft moving apparatus moving the sleeve in the axial direction for pushing the sleeve on the dog clutch portion, and a control portion controlling an operation of the shaft moving apparatus to selectively engage the sleeve and the dog clutch portion. The sleeve includes a multiple number of lower teeth and a multiple number of higher teeth formed with teeth that are taller than the lower teeth. The dog clutch portion includes same number of clutch front teeth as number of the higher teeth, the clutch front teeth formed at positions corresponding to the higher teeth and extending in the axial direction, the clutch front teeth formed with an outer diameter larger than an inner diameter of the higher teeth and smaller than an inner diameter of the lower teeth. The dog clutch portion includes a multiple number of clutch rear teeth formed at positions between the clutch front teeth, the positions recessed from the clutch front teeth by a predetermined amount, and extending in the axial direction. The dog clutch portion includes clutch tooth grooves formed between adjacently positioned clutch front tooth and the clutch rear tooth and between adjacently positioned clutch rear teeth, the clutch tooth grooves engageable with the sleeve. The control portion includes a push force reduction control portion performing a push force reduction control reducing a push force of the sleeve that the shaft moving apparatus applies on the clutch rear teeth in response to a back and forth movement of the sleeve after the sleeve reaches an end surface of the clutch rear tooth. The control portion includes a retry control portion performing a retry control that re-applies the push force of the sleeve in response to a predetermined retry condition after the push force reduction control is performed.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
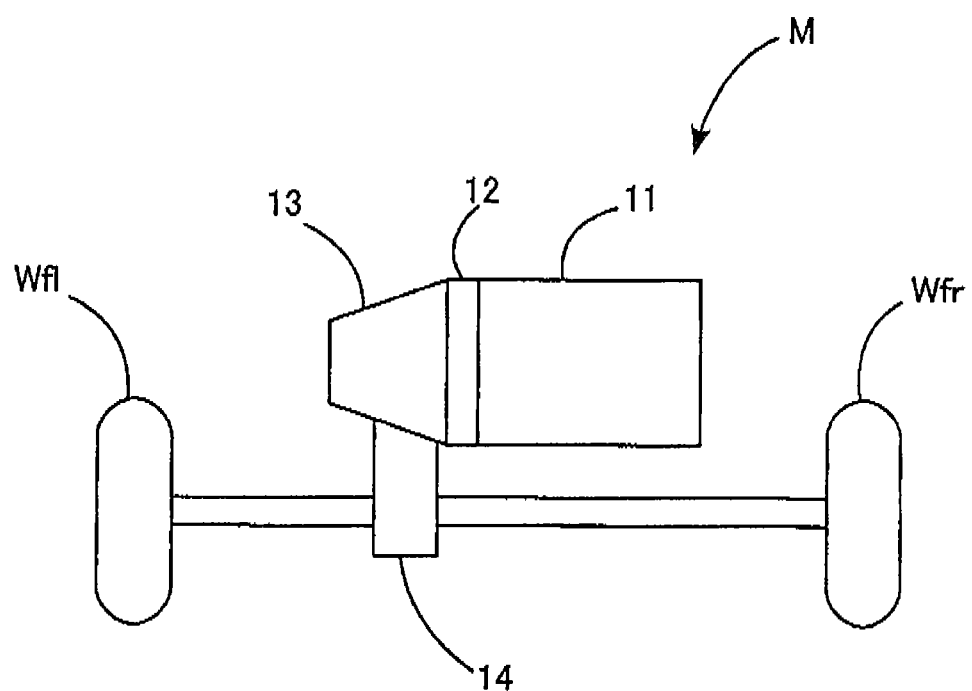
FIG. 1 is a diagrammatic drawing illustrating a configuration of a vehicle where an automatic shift device for an automated transmission for the vehicle according to this disclosure may be applied.

An automatic shift device 10 for an automated transmission 13 for a vehicle M according to a first embodiment will be described referring to drawings. FIG. 1 is a diagrammatic drawing illustrating a configuration of the vehicle M where the automated transmission 13 including the automatic shift device 10 equipped with a dog clutch is mounted on the vehicle M. As FIG. 1 illustrates, the vehicle M includes an engine 11, a clutch 12, the automated transmission 13, a differential apparatus 14, and driving wheels Wfl, Wfr, which are left and right front wheels. The engine 11 is an apparatus generating a driving force by combustion of fuel. The driving force from the engine 11 is transmitted to the driving wheels Wfl, Wfr via the clutch 12, the automated transmission 13, and the differential apparatus 14. In other words, the vehicle M is a vehicle generally referred to as a front-engine front-drive (FF) vehicle. An FF vehicle is an example of the vehicle M and the vehicle M is not limited to the FF vehicle. The vehicle M may be a front wheel drive vehicle, a four wheel drive vehicle, or a similar vehicle.

Figure 2:
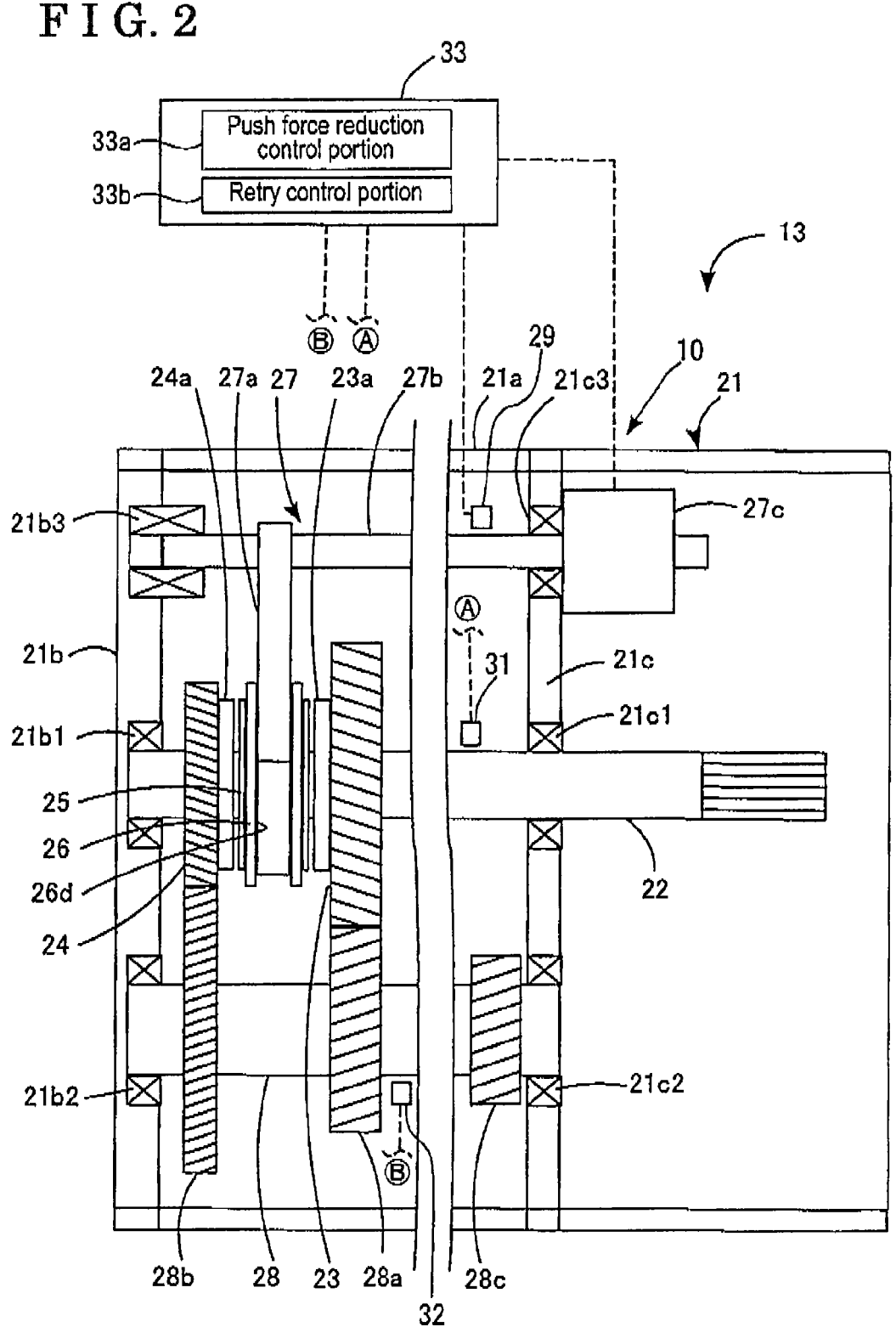
FIG. 2 is an explanatory drawing illustrating the automated transmission where the automatic shift device for the automated transmission for the vehicle according to this disclosure may be applied.

The clutch 12 is configured so as to automatically connect and disconnect in response to commands from a control portion 33. As FIG. 2 illustrates, the automated transmission 13 includes the automatic shift device 10 equipped with a dog clutch mechanism. The automated transmission 13 automatically selects a gear position from, for example, five positions for forward movement and one position for backward movement. In FIG. 2, two gear positions for forward movement are selected for illustration. The differential apparatus 14 includes each of a final gear and a differential gear as components. The differential apparatus 14 is integrally formed with the automated transmission 13.

As FIG. 2 illustrates, the automated transmission 13 includes a casing 21, an input shaft 22, an output shaft 28, and the automatic shift device 10. Each of the input shaft 22 and the output shaft 28 serves as a rotation shaft. In the automatic shift device 10 for the automated transmission 13 for the vehicle M according to the first embodiment, the input shaft 22 serves as the rotation shaft.

The casing 21 includes a main body 21a formed in substantially a hollow cylinder having a bottom portion, a first wall 21b serving as the bottom portion of the main body 21a, and a second wall 21c that partitions a space inside the main body 21a into leftward-rightward spaces relative to the second wall 21c, where leftward and rightward refer to leftward and rightward in FIG. 2.

The input shaft 22 is rotatably supported by the casing 21. More specifically, one end of the input shaft 22, which is the leftward end in FIG. 2, is supported with a bearing 21b1 by the first wall 21b. The other end of the input shaft 22, which is the rightward end in FIG. 2, is supported with a bearing 21c1 by the second wall 21c. The mentioned other end of the input shaft 22 is in rotary engagement with the output shaft of the engine 11 via the clutch 12, which is illustrated in FIG. 1. As a result, an output from the engine 11 is inputted to the input shaft 22 while the clutch 12 is connected. When the clutch 12 is disconnected, the input shaft 22 is in a state where the input shaft 22 may freely rotate.

The output shaft 28 is rotatably supported by the casing 21. More specifically, one end of the output shaft 28, which is the leftward end in FIG. 2, is supported with a bearing 21b2 by the first wall 21b. The other end of the output shaft 28, which is rightward end in FIG. 2, is supported with a bearing 21c2 by the second wall 21c. A first output gear 28a, a second output gear 28b, and a third output gear 28c are fixed on the output shaft 28 by, for example, spline fitting.

The first output gear 28a is a gear that meshes with a first clutch ring 23. The first clutch ring 23 will be further described later. A gear, more specifically a helical gear, meshing with the first clutch ring 23 is formed on the outer peripheral surface of the first output gear 28a. The second output gear 28b is a gear that meshes with a second clutch ring 24. The second clutch ring 24 will be further described later. A gear, more specifically a helical gear, meshing with the second clutch ring 24 is formed on the outer peripheral surface of the second output gear 28b. The third output gear 28c is a gear that meshes with a clutch ring of the differential apparatus 14. A gear, more specifically a helical gear, meshing with the clutch ring of the differential apparatus 14 is formed on the outer peripheral surface of the third output gear 28c. Accordingly, the output shaft 28 is in rotary engagement with the driving wheels Wfl, Wfr via the differential apparatus 14.

Upon the arrangement described herewith, rotating the driving wheels Wfl, Wfr on moving a vehicle forces the first clutch ring 23 and the second clutch ring 24 to rotate via the differential apparatus 14, the third output gear 28c, the output shaft 28, the first output gear 28a, and the second output gear 28b. The rotation speed Nc1 of the first clutch ring 23 at this time is calculated by multiplying a gear ratio formed between the first output gear 28a and the first clutch ring 23 to the rotation speed No of the output shaft 28, which is detected by a second rotation speed sensor 32.

The rotation speed Nc2 of the second clutch ring 24 is calculated by multiplying a gear ratio formed between the second output gear 28b and the second clutch ring 24 to the rotation speed No of the output shaft 28, which is detected by the second rotation speed sensor 32.

As a result, in a state where the clutch 12, which is arranged so as to be connected and disconnected, is connected, the driving force from the engine 11 is inputted to the input shaft 22, transmitted to the output shaft 28, and finally outputted to the driving wheels Wfl, Wfr via the third output gear 28c and the differential apparatus 14.

Figure 3:
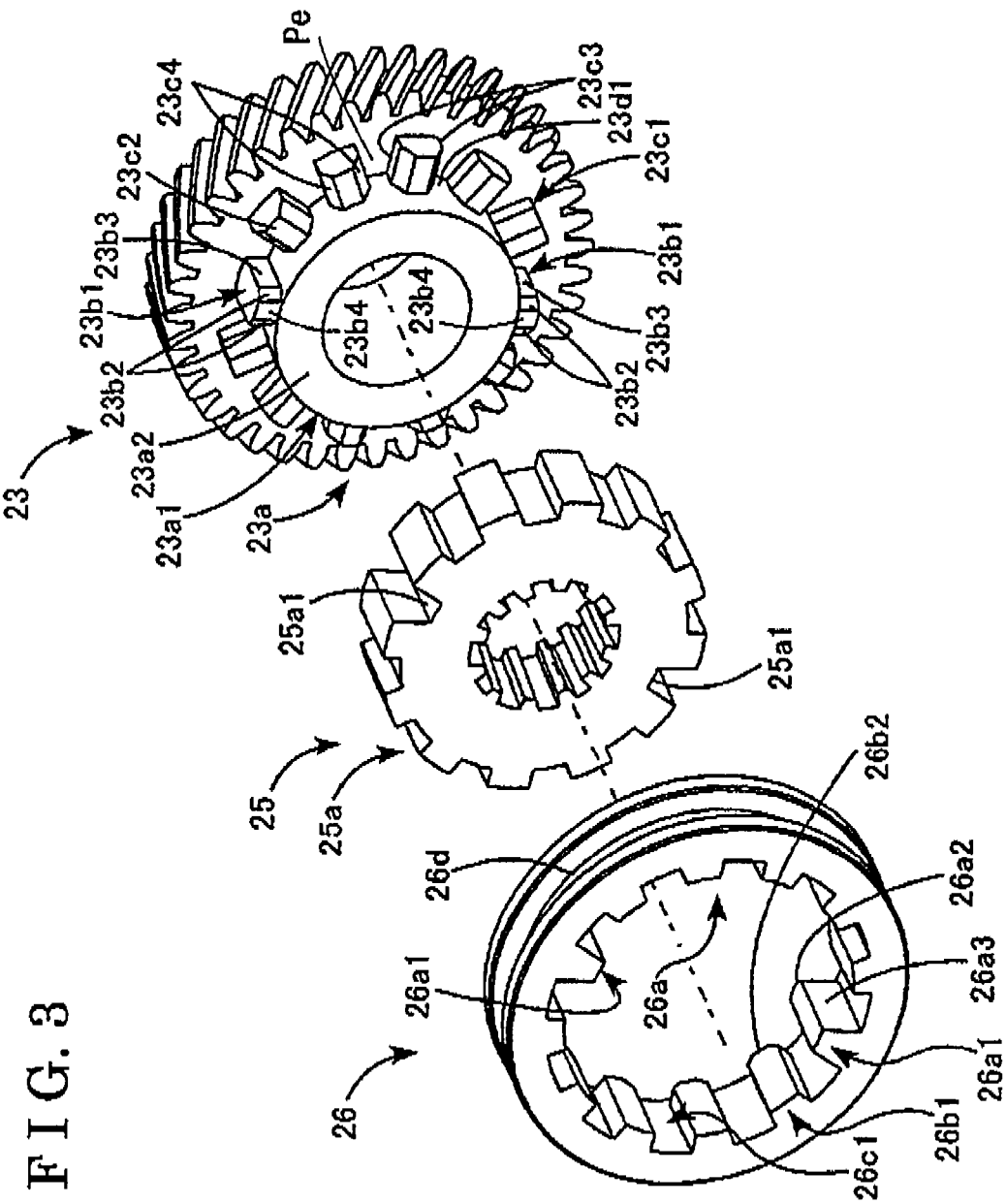
FIG. 3 is an exploded perspective view drawing illustrating a dog clutch portion of the automatic shift device for the automated transmission for the vehicle according to this disclosure.

As FIGS. 2 and 3 illustrate, the automatic shift device 10 includes a clutch hub 25, the first clutch ring 23, the second clutch ring 24, a sleeve 26, a shaft moving apparatus 27, a stroke sensor 29, a first rotation speed sensor 31, the second rotation speed sensor 32, a first dog clutch portion 23a quipped on the first clutch ring 23, a second dog clutch portion 24a equipped on the second clutch ring 24, and a control portion 33, which is an electronic control unit (ECU). Each of the first clutch ring 23 and the second clutch ring 24 serves as the clutch ring.

The clutch hub 25 is fixed on the input shaft 22, which serves as the rotation shaft, by, for example, spline fitting so as to integrally rotate with the input shaft 22 about the axis of rotation of the input shaft 22. As FIG. 3 illustrates, a spline 25a is formed on the outer peripheral surface of the clutch hub 25. A spline 26a is formed on the inner peripheral surface of the sleeve 26. The spline 25a engages with the spline 26a so as to be slidable in an axial direction of the input shaft 22. The spline 25a is formed with a multiple number of recesses 25a1, for example, two recesses 25a1, having recessed deeper than the rest of the recesses. The mentioned multiple number of recesses 25a1 are the recesses corresponding to a multiple number of higher teeth 26a1 of the sleeve 26. The higher teeth 26a1 of the sleeve 26 will be further described later.

Each of the first clutch ring 23 and the second clutch ring 24 are idly rotatably supported by the input shaft 22, which serves as the rotation shaft. The first clutch ring 23 and the second clutch ring 24 are respectively arranged at positions adjacent to surfaces of the clutch hub 25 spaced apart in the axial direction of the input shaft 22. A gear, more specifically a helical gear, meshing with the first output gear 28a, which is fixed on the output shaft 28, is formed on the outer peripheral surface of the first clutch ring 23. A gear, more specifically a helical gear, meshing with the second output gear 28b, which is fixed on the output shaft 28, is formed on the outer peripheral surface of the second clutch ring 24. Accordingly, the first clutch ring 23 and the second clutch ring 24 are in rotary engagement with the output shaft 28.

The first dog clutch portion 23a that engages with the spline 26a formed on the sleeve 26 is formed on the surface of the first clutch ring 23 facing the direction of the clutch hub 25. The second dog clutch portion 24a that engages with the spline 26a formed on the sleeve 26 is formed on the surface of the second clutch ring 24 facing the direction of the clutch hub 25, which is the direction of the sleeve 26. Each of the first dog clutch portion 23a and the second dog clutch portion 24a serves as the dog clutch portion.

The first dog clutch portion 23a of the first clutch ring 23 and the second dog clutch portion 24a of the second clutch ring 24 are identical in configuration. Accordingly, the first dog clutch portion 23a will be described in detail by referring to FIG. 3 where the first clutch ring 23, the clutch hub 25, and the sleeve 26 are illustrated and the descriptions in detail of the second dog clutch portion 24a will be omitted.

As FIG. 3 illustrates, the first dog clutch portion 23a includes a protruding portion 23a1, clutch front teeth 23b1, and clutch rear teeth 23c1. The protruding portion 23a1 is formed in a ring form. Two clutch front teeth 23b1 are positioned at 180 degrees interval on an outer peripheral portion of the protruding portion 23a1. The clutch rear teeth 23c1 are positioned between the two clutch front teeth 23b1 on the outer peripheral portion of the protruding portion 23a1. More specifically, five clutch rear teeth 23c1 are arranged at equal angular intervals between the two clutch front teeth 23b1 in each circumferential direction. The clutch front teeth 23b1 and the clutch rear teeth 23c1 are formed on the outer peripheral portion of the protruding portion 23a1 spaced apart with a clutch tooth groove 23d1 formed between each of the clutch front teeth 23b1 and the clutch rear teeth 23c1. Each of the clutch tooth grooves 23d1 is provided with a unique width in the circumferential direction. In other words, as FIG. 3 illustrates, six clutch tooth grooves 23d1 are formed between the two clutch front teeth 23b1 within the 180 degrees interval in a direction toward a viewer of FIG. 3 and six clutch recess 23d1 are formed between the two clutch front teeth 23b1 within the 180 degrees interval in a direction away from the viewer of FIG. 3.

The protruding portion 23a1 is formed such that the outer diameter of the protruding portion 23a1 is smaller than the inner diameter of the higher teeth 26a1 of the spline 26a. The clutch front teeth 23b1 are formed such that the outer diameter of the clutch front teeth 23b1 is larger than the inner diameter of the higher teeth 26a1 of the spline 26a and smaller than the inner diameter of lower teeth 26b1 of the spline 26a. The clutch rear teeth 23c1 are formed so as to be able to mesh with spline tooth recesses 26c1 of the spline 26a. In other words, the clutch front teeth 23b1 are formed so as not to mesh with the lower teeth 26b1 and formed so as to be able to mesh with the higher teeth 26a1. The clutch rear teeth 23c1 are formed so as to be able to mesh with the higher teeth 26a1 and the lower teeth 26b1.

The number of the clutch front teeth 23b1 formed is equal to the number of the higher teeth 26a1 formed. In the automatic shift device 10 for the automated transmission 13 for the vehicle M according to the first embodiment, two clutch front teeth 23b1 are formed and equally two higher teeth 26a1 are formed. The clutch front teeth 23b1 is reduced in numbers so that two higher teeth 26a1 may easily enter a space between two clutch front teeth 23b1 even in a state where a rotational speed difference between the sleeve 26 and the first clutch ring 23 is large. Each of the clutch front teeth 23b1 is formed at a position corresponding to the position of the higher tooth 26a1 and extends in the axial direction from the front end surface 23a2 of the protruding portion 23a1 to the rear end position Pe of the first dog clutch portion 23a. Each of the clutch rear teeth 23c1 extends in the axial direction from a position recessed by a predetermined distance from the front end surface 23a2 of the protruding portion 23a1 to the rear end position Pe of the first dog clutch portion 23a.

An end surface 23b4 for making contact with the higher teeth 2631 is formed at the front end portion of each of the clutch front teeth 23b1 facing the higher tooth 26a1. Furthermore, each of the clutch front teeth 23b1 is formed with slanted surfaces 23b2 slanted toward the rear end position Pe of the first dog clutch portion 23a respectively from the ends of the end surface 23b4 spaced apart in the circumferential direction. The end surface 23b4 of the clutch front tooth 23b1 is formed on the same plane as the front end surface 23a2 of the protruding portion 23a1 or, alternatively, on a plane parallel to the front end surface 23a2 of the protruding portion 23a1. On the front end surface of each of the clutch rear teeth 23c1 facing the higher teeth 26a1 and the lower teeth 26b1 of the sleeve 26, an end surface 23c2 for making contact with the higher teeth 26a1 and the lower teeth 26b1 is formed. Each of the slanted surfaces 23b2 of the clutch front tooth 23b1 intersects each of side surfaces 23b3 of the clutch front tooth 23b1 at a position in a direction of the front end surface 23a2 of the protruding portion 23a1 relative to the end surfaces 23c2 of the clutch rear teeth 23c1. Portions where the end surface 23b4 at the front end portion of the clutch front tooth 23b1 and the slanted surfaces 23b2 intersect are chamfered and rounded in a typical R-form. As FIG. 3 illustrates, each of the clutch rear teeth 23c1 includes the end surface 23c2, side surfaces 23c3, and slanted surfaces 23c4 formed to connect between the end surface 23c2 and each of the side surfaces 23c3.

As FIG. 3 illustrates, the sleeve 26, which is formed in a ring form, integrally rotates with the clutch hub 25 and is slidable in the axial direction relative to the clutch hub 25. The spline 26a is formed on the inner peripheral surface of the sleeve 26. The spline 26a engages with the spline 25a formed on the outer peripheral surface of the clutch hub 25 so as to be slidable in the axial direction. The spline 26a is formed with a multiple number of higher teeth 26a1, for example, two higher teeth 26a1, protruding higher than the rest of lower teeth 26b1. Corner edge portions of each of the higher teeth 26a1 and each of the lower teeth 26b1, which are the corner edge portions at the front end surfaces 26a2, 26b2 in the direction of the first clutch ring 23, are chamfered in 45 degrees angle to form a typical C-form in order to protect the higher teeth 26a1 and the lower teeth 26b1 from being damaged by a shock at a time at which the higher teeth 26a1 and the lower teeth 26b1 make contact with the clutch front teeth 23b1 and with the clutch rear teeth 23c1. The sleeve 26 includes side surfaces 26a3 at the higher teeth 26a1. On an outer peripheral surface of the sleeve 26, an outer peripheral recess 26d is formed to extend in a direction conforming to a circumferential direction of the sleeve 26. An arc form portion at an end of the fork 27a engages with the outer peripheral recess 26d so as to be slidable in the circumferential direction of the sleeve 26.

As FIG. 2 illustrates, the shaft moving apparatus 27 is an apparatus making the sleeve 26 move back and forth in a direction that conforms to the axial direction. The shaft moving apparatus 27 is configured such that the shaft moving apparatus 27 allows the sleeve 26 to move by a reaction force applied from the first clutch ring 23 or the second clutch ring 24 at a time at which the sleeve 26 is pushed on the first clutch ring 23 or the second clutch ring 24.

The shaft moving apparatus 27 includes, a fork 27a, a fork shaft 27b, and a drive apparatus 27c, which is an actuator. An end portion of the fork 27a is formed to fit to an outer peripheral form of the outer peripheral recess 26d of the sleeve 26. A base end portion of the fork 27a is fixed on the fork shaft 27b. The fork shaft 27b is supported by the casing 21 to be slidable in a direction conforming to the axial direction of the fork shaft 27b. More specifically, one end of the fork shaft 27b, which is leftward end in FIG. 2, is supported with a bearing 21b3 by the first wall 21b. The other end of the fork shaft 27b, which is rightward end in FIG. 2, is supported with a bearing 21c3 by the second wall 21c. The mentioned other end of the fork shaft 27b is arranged to penetrate through the drive apparatus 27c.

The drive apparatus 27c is a linear actuator driven by a linear motor of a known type. An example of the linear motor is disclosed in JP2008-259413A. More specifically, the drive apparatus 27c includes a multiple number of coils arranged side by side in the axial direction to form a hollow cylindrical core and a fork shaft 27b, which is equipped with a multiple number of N-pole magnets and a multiple number of S-pole magnets alternately arranged side by side, penetrating a through-hole extending through the drive apparatus 27e. The fork shaft 27b is controlled to move back and forth or controlled to be retained at a selected position by controlling the supply of electricity to the coils. The drive apparatus 27c is electrically connected to the control portion 33 as a broken line in FIG. 2 illustrates and operated by commands from the control portion 33.

In the automatic shift device 10 for the automated transmission 13 for the vehicle M according to the first embodiment, a linear actuator is used as the drive apparatus 27c, however, the drive apparatus 27c is not limited to such linear actuator. The drive apparatus 27c may be replaced by a drive apparatus of a different type, for example, a solenoid type actuator or an oil pressure type actuator, provided that the drive apparatus 27c is configured such that the drive apparatus 27c allows movement of the sleeve 26 by a reaction force from the first clutch ring 23 or the second clutch ring 24 while the sleeve 26 is pushed on the first clutch ring 23 or the second clutch ring 24 with a predetermined load. In addition, a drive apparatus that converts movement of a rotationally driven motor into movement in a straight line direction may be used as the drive apparatus 27c, alternatively.

As FIG. 2 illustrates, the stroke sensor 29 is positioned close to the fork shaft 27b so as to detect the moving amount of the fork shaft 27b, which is the moving amount Sd of the sleeve 26 in the axial direction. The stroke sensor 29 is connected to the control portion 33 as a broken line in FIG. 2 illustrates and is transmitting detected data to the control portion 33. The structure of the stroke sensor 29 may be in any structure.

As FIG. 2 illustrates, the first rotation speed sensor 31 is positioned close to the input shaft 22 and detects the rotation speed of the input shaft 22, which in other words is the rotation speed of the rotation shaft, which is the rotation speed Ns of the sleeve 26. The first rotation speed sensor 31 is connected to the control portion 33 as a broken line at A indicates in FIG. 2 and is transmitting detected data to the control portion 33. The second rotation speed sensor 32, as FIG. 2 illustrates, is positioned closed to the output shaft 28 and detects the rotation speed No of the output shaft 28. The second rotation speed sensor 32 is connected to the control portion 33 as a broken line at B indicates in FIG. 2 and is transmitting detected data to the control portion 33. The structure of the first rotation speed sensor 31 may be in any structure and the structure of the second rotation speed sensor 32 may be in any structure.

The control portion 33, which is an ECU, sends command signals to the drive apparatus 27c of the shaft moving apparatus 27 in order to operate the fork shaft 27b. Accordingly, the sleeve 26 is moved back and forth in the axial direction via the fork 27a connected to the fork shaft 27b so as to engage and disengage the spline 26a of the sleeve 26 with the first dog clutch portion 23a.

The control portion 33 includes a push force reduction control portion 33a and a retry control portion 33b. The push force reduction control portion 33a performs a push force reduction control that reduces the push force F of the sleeve 26 that the shaft moving apparatus 27 applies on the clutch rear teeth 23c1 in response to the back and forth movement of the sleeve 26 after the sleeve 26 reaches the end surface 23c2 of the clutch rear tooth 23c1. The retry control portion 33b performs a retry control that re-applies the push force F of the sleeve 26 in response to a predetermined retry condition after the push force reduction control is performed. Accordingly, the control portion 33 performs the retry control, or a re-entry control. Operations of portions described by referring to the first clutch ring 23 are similarly applicable to the operations of similar portions including the second clutch ring 24. Accordingly, the operations including the first clutch ring 23 will be described and the descriptions on the operations including the second clutch ring 24 will be omitted.

The above-mentioned retry control, or the re-entry control, will be described first. As an example of the operation of the retry control, the operation at which a gear stage is shifted from the gear stage initially established by the second clutch ring 24 and the second output gear 28b to the gear stage that the first clutch ring 23 and the first output gear 28a establish so as to increase speed will be described.

In order to shift the gear stage, the control portion 33 first disconnects the clutch 12. The control portion 33 then operates the shaft moving apparatus 27 so as to move the fork shaft 27b in the axial direction toward the first clutch ring 23. Accordingly, the gear stage established by the second clutch ring 24 and the second output gear 28b is disengaged.

Figure 4:
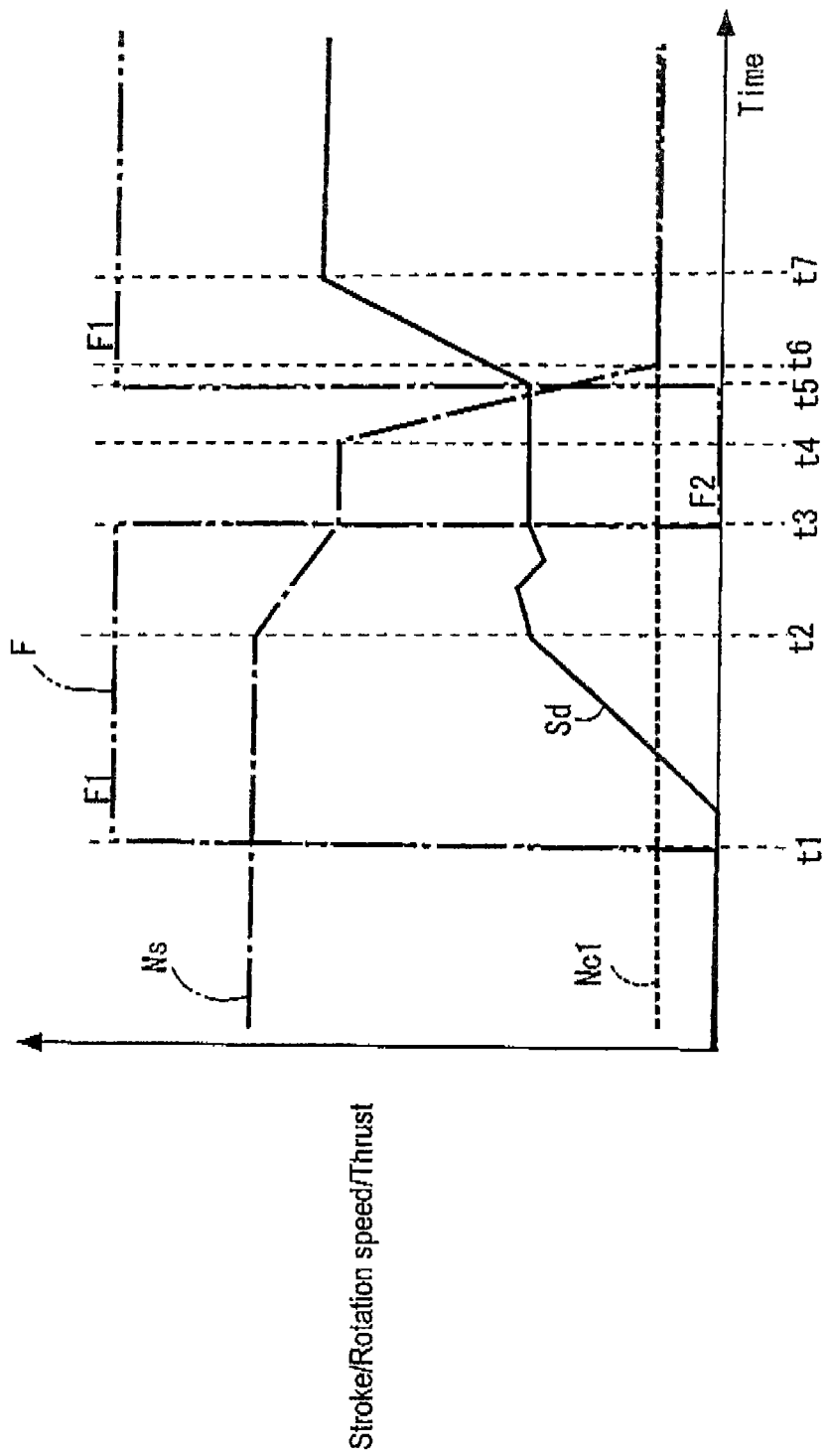
FIG. 4 is a time line chart illustrating an operation of a retry control in the automatic shift device for the automated transmission for the vehicle according to this disclosure.
Figure 5:
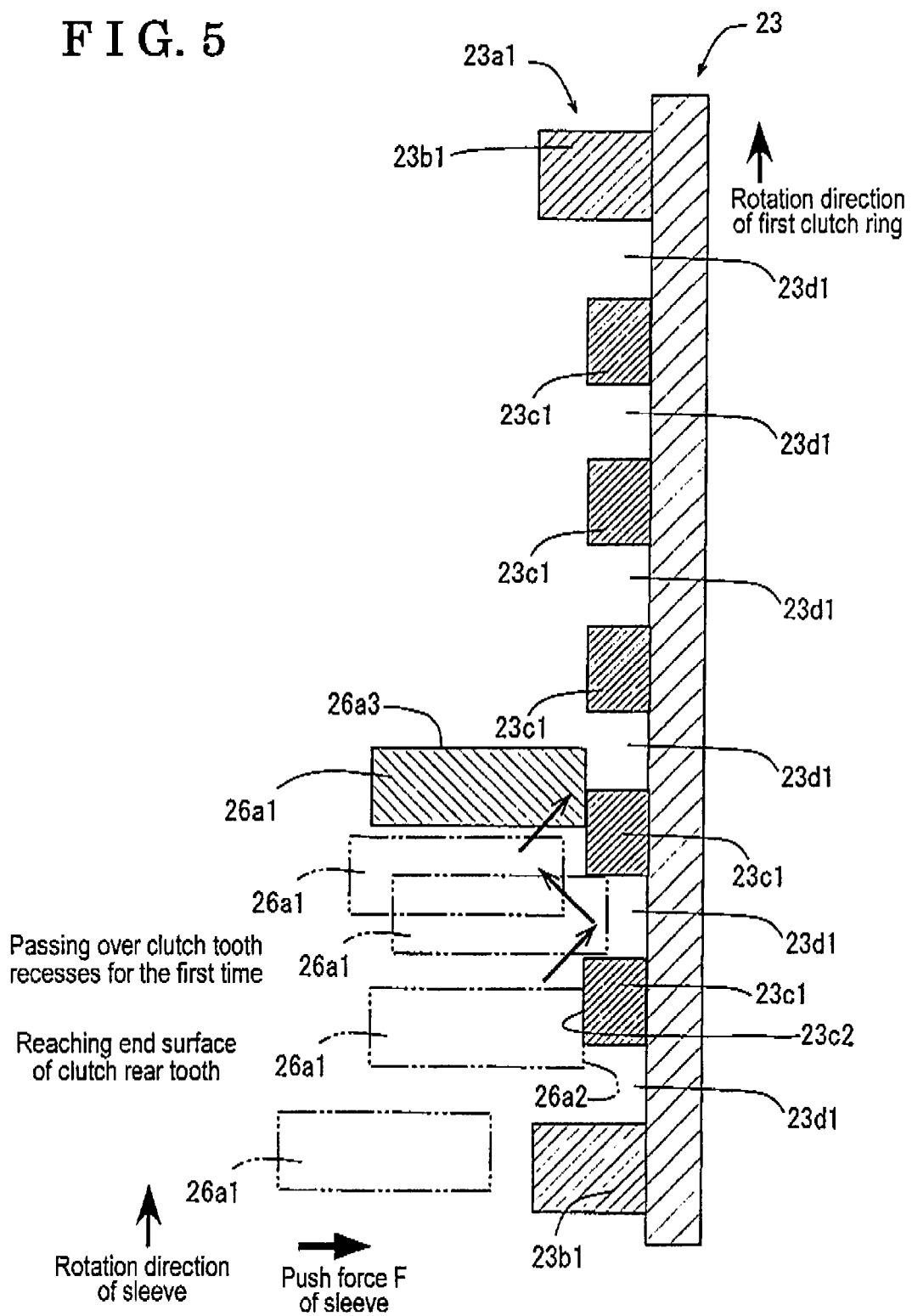
FIG. 5 is a schematic view drawing illustrating a state where a sleeve temporarily bounces off at a clutch tooth groove before making an entry into the clutch tooth grooves in the automatic shift device for the automated transmission for the vehicle according to this disclosure.

In order to establish the gear stage that the first clutch ring 23 and the first output gear 28a establish, the control portion 33 next operates the shaft moving apparatus 27 to bias the sleeve 26, which is connected to the fork shaft 27b and the fork 27a, toward the first clutch ring 23 so as to apply a first load F1 as the push force F of the sleeve 26 on the first clutch ring 23 at the time t1 that is indicated in FIG. 4. The first load F1 is a predetermined selected value. By applying the first load F1 on the sleeve 26, the sleeve 26 shifts toward the first clutch ring 23, the higher teeth 26a1 of the sleeve 26 enters the space between the clutch front teeth 23b1 directly or after making contact with the end surface 23b4 of the clutch front tooth 23b1, and the sleeve 26 reaches the end surface 23c2 of the clutch rear tooth 23c1 at the time t2 that is indicated in FIG. 4 and as FIG. 5 illustrates.

Positions at which the sleeve 26 begins an entry process for entering into the clutch tooth grooves 23d1 vary. In a case where the sleeve 26 is at the position that is not engageable with the clutch tooth grooves 23d1 and the sleeve 26 makes contact with the end surface 23c2 of the clutch rear tooth 23c1, the rotation speed Ns of the sleeve 26 slowly decreases and the sleeve 26 moves in a circumferential direction while being pushed on the end surface 23c2 of the clutch rear tooth 23c1. The back and forth movement of the sleeve 26 is a behavior of the sleeve 26 that occurs at a time at which the sleeve 26 passes over the clutch tooth groove 23d1 that resists entry of the sleeve 26. The sleeve 26 bounces off at such clutch tooth groove 23d1 and moves away from the clutch rear teeth 23c1 and then the sleeve 26 moves again toward the clutch rear teeth 23c1. At this time, the moving amount Sd of the sleeve 26 in the axial direction likewise shows an up and down changes corresponding to the back and forth movement as a period between the time t2 and the time t3 in FIG. 4 indicates. The back and forth movement of the sleeve 26 is detected by the stroke sensor 29.

The automatic shift device 10 for the automated transmission 13 for the vehicle M according to the first embodiment detects the back and forth movement of the sleeve 26 after the sleeve 26 reaches the end surface 23c2 of the clutch rear tooth 23c1 by detecting the sleeve 26 passing over the clutch tooth groove 23d1, in order to determine that the sleeve 26 is unable to engage with the clutch tooth grooves 23d1 beforehand. By determining that the sleeve 26 is unable to engage with the clutch tooth grooves 23d1 at the time at which the back and forth movement of the sleeve 26 is detected for the first time after the sleeve 26 reaches end surfaces 23c2 of the clutch rear teeth 23c1, which in other words is at the time at which the sleeve 26 passes over the clutch tooth grooves 23d1 for the first time, which is illustrated in FIG. 5, the automatic shift device 10 for the automated transmission 13 for the vehicle M according to the first embodiment determines beforehand that the sleeve 26 is unable to engage with the clutch tooth grooves 23d1 at an earlier point in time.

Figure 6:
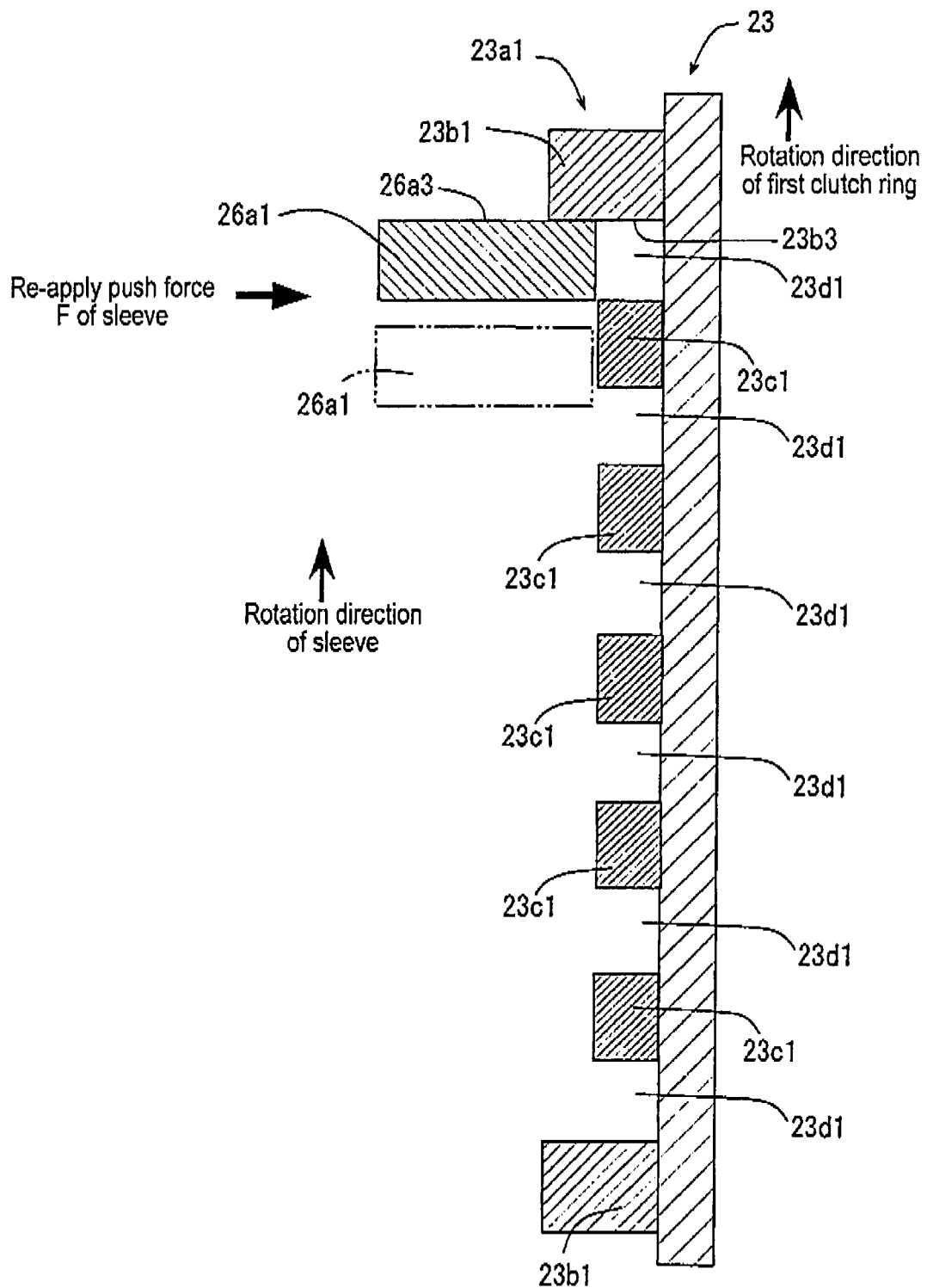
FIG. 6 is a schematic view drawing illustrating a state where the sleeve is in contact with a side surface of a clutch front tooth in the automatic shift device for the automated transmission for the vehicle according to this disclosure.

A state in which the sleeve 26 is unable to engage with the clutch tooth grooves 23d1 includes a state in which the sleeve 26 is in contact with the end surface 23c2 of the clutch rear tooth 23c1 and the difference between the rotation speed Ns of the sleeve 26 and the rotation speed Nc1 of the first clutch ring 23 is small, so that the side surface 26a3 of the higher tooth 26a1 of the sleeve 26 requires inappropriately long time to reach the side surface 23b3 of the clutch front tooth 23b1, which is the state illustrated in FIG. 6, after a process of the sleeve 26 passing over the end surfaces 23c2 of the clutch rear teeth 23c1 and the sleeve 26 establishes a state in which the phase of the sleeve 26 may be easily matched with the phase of the clutch tooth grooves 23d1.

In a state where the sleeve 26 is unable to engage with the clutch tooth grooves 23d1, a retry control, or a re-entry control, is performed so as to make the sleeve 26 correctly engage, or mesh, with the clutch tooth grooves 23d1 of the first clutch ring 23. The retry control is a control that reduces the push force F of the sleeve 26 and re-applies the push force F of the sleeve 26 after the push force F of the sleeve 26 is reduced.

In a case where the back and forth movement of the sleeve 26 has occurred after the sleeve 26 reaches the end surface 23c2 of the clutch rear tooth 23c1, the push force reduction control portion 33a initiates the push force reduction control that reduces the push force F of the sleeve 26 from the first load F1 to a second load F2, which is a load smaller than the first load F1, at the time t3 indicated in FIG. 4. The second load F2 may be defined as a value that maintains a state where the sleeve 26 is pushed on the end surfaces 23c2 of the clutch rear teeth 23c1. In the automatic shift device for an automated transmission for a vehicle according to the first embodiment, the second load F2 is reduced to zero load so as to maintain the position of the sleeve 26.

Reducing the push force F of the sleeve 26 to the second load F2 reduces the frictional force between the teeth of the sleeve 26 and the end surfaces 23c2 of the clutch rear teeth 23c1 so that the rotation speed Ns of the sleeve 26 and the rotation speed Nc1 of the first clutch ring 23 are maintained at different rotation speeds without difficulties and the sleeve 26 and the clutch tooth grooves 23d1 are brought into a state in which the phase of the sleeve 26 may be easily matched with the phase of the clutch tooth grooves 23d1. As a result, the time required for the side surface 26a3 of the higher tooth 26a1 of the sleeve 26 to make contact with the side surface 23b3 of the clutch front tooth 23b1 at the time t4 indicated in FIG. 4, which is a state illustrated in FIG. 6, may be reduced.

The retry control portion 33b initiates the retry control that re-applies the first load F1 as the push force F of the sleeve 26 in response to a predetermined retry condition, which is the condition where the sleeve 26 and the clutch tooth grooves 23d1 are brought into a state in which the phase of the sleeve 26 easily matches with the phase of the clutch tooth grooves 23d1, at the time t5 indicated in FIG. 4. The retry condition may be defined on the basis of a behavior of the sleeve 26, the behavior that the side surface 26a3 of the higher tooth 26a1 of the sleeve 26 approaches the side surface 23b3 of the clutch front tooth 23b1 so as to make contact with the side surface 23b3 of the clutch front tooth 23b1.

More specifically, three retry conditions will be described. First retry condition is where a deceleration gradient ΔNs of the rotation speed Ns of the sleeve 26 rapidly changes and becomes larger than a predetermined threshold value ΔNs1 of the deceleration gradient ΔNs in response to the side surface 26a3 of the higher tooth 26a1 of the sleeve 26 making contact with the side surface 23b3 of the clutch front tooth 23b1 at the time t4 in FIG. 4, which are the states illustrated in FIGS. 7 and 8.

Second retry condition is where the difference Nd of rotation speeds between the rotation speed Ns of the sleeve 26 and the rotation speed Nc1 of the first clutch ring 23 becomes equal to or less than a predetermined threshold value Nd1 for the difference Nd of rotation speeds between the rotation speed Ns of the sleeve 26 and the rotation speed Nc1 of the first clutch ring 23 in response to the side surface 26a3 of the higher tooth 26a1 of the sleeve 26 making contact with the side surface 23b3 of the clutch front tooth 23b1 and decreases the rotation speed Ns of the sleeve 26.

Figure 8:
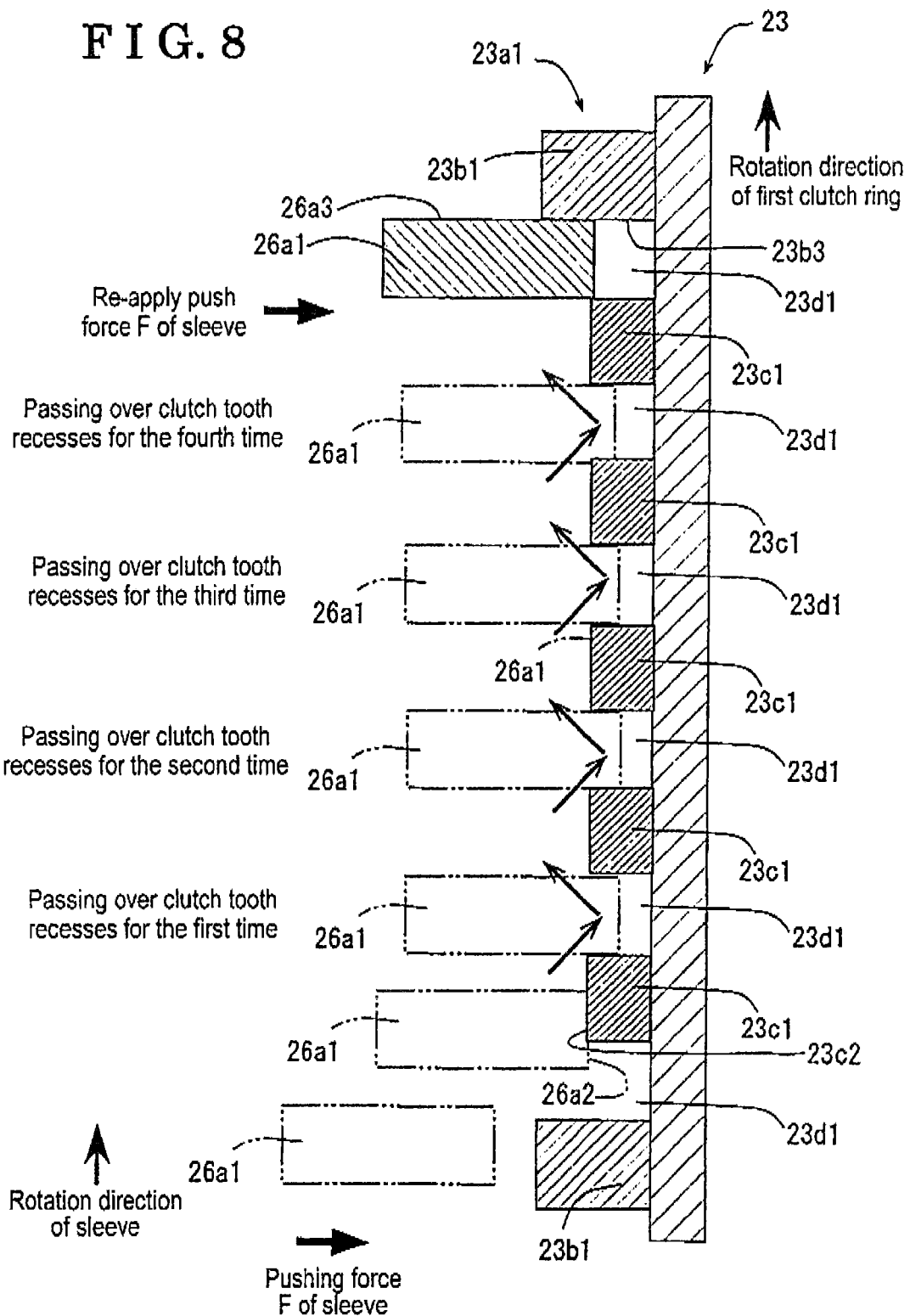
FIG. 8 is a schematic view drawing illustrating a state where the sleeve passes over the clutch tooth grooves in the automatic shift device for the automated transmission for the vehicle according to this disclosure.

Third retry condition is, as FIG. 8 illustrates, where the count of the number of times that the clutch tooth grooves 23d1 are passed by the sleeve 26 becomes a number equal to or more than the number of the clutch tooth grooves 23d1 minus two, the count that is detected on the basis of the output from the stroke sensor 29. The first clutch ring 23, which is illustrated in FIG. 3, includes two clutch front teeth 23b1 and five clutch rear teeth 23c1 between the two clutch front teeth 23b1 in each circumferential direction. As a result, the first clutch ring 23 includes six clutch tooth grooves 23d1 between the two clutch front teeth 23b1 in each circumferential direction. As FIG. 8 illustrates, in a case where the higher tooth 26a1 of the sleeve 26 enters the space between the clutch front teeth 23b1 and the count of the number of times that the clutch tooth grooves 23d1 are passed by the higher tooth 26a1 of the sleeve 26 becomes a number more than four, which is the number obtained by subtracting two from six that is the number of the clutch tooth grooves 23d1, the side surface 26a3 of the higher tooth 26a1 of the sleeve 26 is in a state where the phase of the sleeve 26 is easily matched with the phase of the clutch tooth grooves 23d1 at the next time when the sleeve 26 passes over the clutch tooth groove 23d1 because the side surface 26a3 of the higher tooth 26a1 of the sleeve 26 makes contact with the side surface 23b3 of the clutch front tooth 23b1 at the next time when the sleeve 26 passes over the clutch tooth groove 23d1. The number of times that the clutch tooth grooves 23d1 are passed by the sleeve 26 may be detected by the stroke sensor 29 by detecting the changes in the moving amount Sd, which indicates the back and forth movement of the sleeve 26, at each time the sleeve 26 passes over the clutch tooth groove 23d1.

Figure 7:
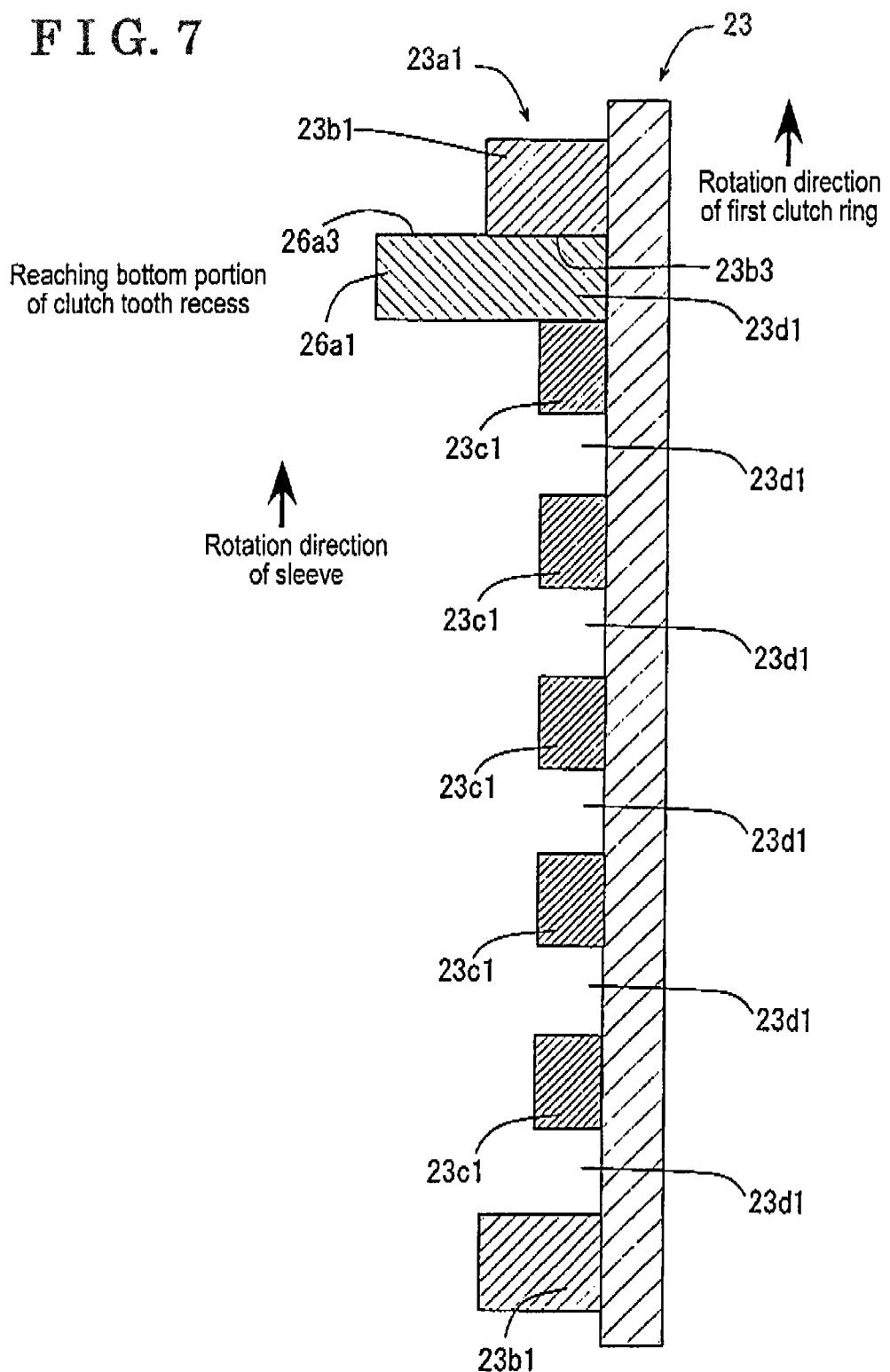
FIG. 7 is a schematic view drawing illustrating a state where the sleeve has reached the bottom portions of the clutch tooth grooves in the automatic shift device for the automated transmission for the vehicle according to this disclosure.

As a result of the retry control portion 33b performing the retry control, the sleeve 26 and the clutch tooth grooves 23d1 are brought into a state in which the phase of the sleeve 26 easily matches with the phase of the clutch tooth grooves 23d1 at the time t6 indicated in FIG. 4 so that the sleeve 26 reaches the bottom portions of the clutch tooth grooves 23d1 and becomes a state where the sleeve 26 and the clutch tooth grooves 23d1 are correctly engaged, or meshed, by the retry control at the time t7 indicated in FIG. 4, which is a state illustrated in FIG. 7.

The operations of the automatic shift device 10 included in the automated transmission 13 will be described next. As an example of the operation, the operation at which a gear stage is shifted from the gear stage initially established by the second clutch ring 24 and the second output gear 28b to the gear stage the first clutch ring 23 and the first output gear 28a establish that increases speed will be described. At this time, the control portion 33 disconnects the clutch 12 in order to shift the gear stage, and the rotation speed Ns of the sleeve 26 that has been engaged with the second clutch ring 24 is larger than the rotation speed Nc1 of the first clutch ring 23.

Figure 9:
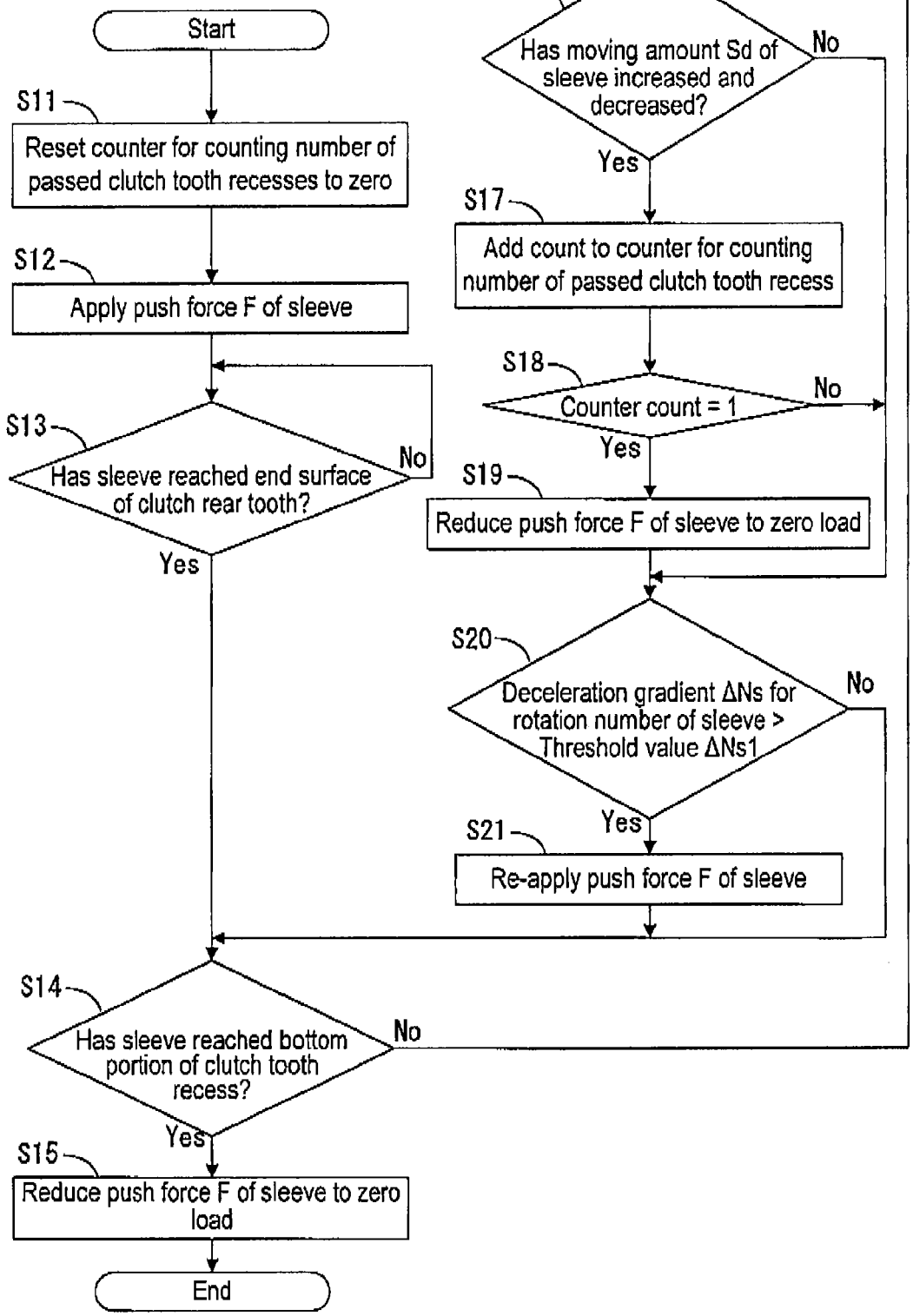
FIG. 9 is a flowchart illustrating an operation of the automatic shift device for the automated transmission for the vehicle according to a first embodiment.

The operations of the automatic shift device 10 for the automated transmission 13 for the vehicle M according to the first embodiment will be described referring to the flowchart illustrated in FIG. 9. The automatic shift device 10 is included in the automated transmission 13 in the above-described state so as to shift the gear stage to the gear stage established by the first clutch ring 23 and the first output gear 28a that increases speed. In step S11, a counter for counting the number of passed clutch tooth grooves is reset to zero by a command from the control portion 33. In step S12, by a command from the control portion 33, the shaft moving apparatus 27 is operated so as to apply the first load F1 as the push force F of the sleeve 26 so that the sleeve 26 starts moving in the axial direction toward the first clutch ring 23. When the sleeve 26 is moved toward the first clutch ring 23, the higher tooth 26a1 of the sleeve 26 enters the space between the two clutch front teeth 23b1 of the first clutch ring 23.

In step S13, whether or not the sleeve 26 has reached the end surface 23c2 of the clutch rear tooth 23c1 is determined. Whether or not the sleeve 26 has reached the end surface 23c2 of the clutch rear tooth 23c1 may be determined by the moving amount Sd of the sleeve 26 detected by the stroke sensor 29. In a state where the moving amount Sd of the sleeve 26 indicates that the sleeve 26 has not moved by an amount required for the sleeve 26 to reach the end surface 23c2 of the clutch rear tooth 23c1, the stroke of the sleeve 26 is still in an intermediate process to reach the end surface 23c2 of the clutch rear tooth 23c1 so that the step S13 is repeated until the sleeve 26 reaches the end surface 23c2 of the clutch rear tooth 23c1.

When the sleeve 26 reaches the end surface 23c2 of the clutch rear tooth 23c1, the control routine shifts to step S14. In step S14, whether or not the sleeve 26 has reached the bottom portion of the clutch tooth groove 23d1 is determined. Whether or not the sleeve 26 has reached the bottom portion of the clutch tooth groove 23d1 is determined by the moving amount Sd of the sleeve 26 detected by the stroke sensor 29. In a state where the sleeve 26 is determined that the sleeve 26 has reached the bottom portion of the clutch tooth groove 23d1 in step S14, the higher teeth 26a1 of the sleeve 26 and the lower teeth 26b1 of the sleeve 26 are engaged with the clutch tooth grooves 23d1 so that the sleeve 26 and the first clutch ring 23 are completely meshed and synchronously rotate.

After the sleeve 26 is determined that the sleeve 26 has reached the bottom portion of the clutch tooth groove 23d1, the shaft moving apparatus 27 is operated by a command from the control portion 33 in step S15 so as to reduce the push force F of the sleeve 26 to zero load so that the position of the sleeve 26 is maintained and the shift operation is completed.

Ideally, after the sleeve 26 has reached the end surface 23c2 of the clutch rear tooth 23c1, the sleeve 26 smoothly engages with the clutch tooth grooves 23d1 such that the higher teeth 26a1 and the lower teeth 26b1 of the sleeve 26 completely mesh with the clutch tooth grooves 23d1 so that the shift operation ends in a short time, however, in a case where the sleeve 26 has not reached the bottom portion of the clutch tooth groove 23d1 after the sleeve 26 has reached the end surface 23c2 of the clutch rear tooth 23c1, the control routine shifts to step S16, which is processed by the push force reduction control portion 33a, and determines whether or not the moving amount Sd of the sleeve 26 has increased and decreased.

The moving amount Sd of the sleeve 26 increases and decreases when, as FIG. 5 illustrates, the sleeve 26 moves in the circumferential direction while being applied with the first load F1 as the push force F of the sleeve 26 and pushed on the end surface 23c2 of the clutch rear tooth 23c1. The sleeve 26 bounces off at the clutch tooth groove 23d1 that resists entry of the sleeve 26 at the time at which the sleeve 26 passes over such clutch tooth groove 23d1. The sleeve moves away from the clutch rear teeth 23c1 at once and then the sleeve 26 moves again toward the clutch rear teeth 23c1 so that the back and forth movement of the sleeve 26 occurs. The moving amount Sd of the sleeve 26 likewise indicates one up and down change corresponding to the back and forth movement of the sleeve 26 that occurs at each time the sleeve 26 passes over the clutch tooth groove 23d1 that resists entry of the sleeve 26. In a case where the moving amount Sd of the sleeve 26 is determined that the moving amount Sd of the sleeve 26 has increased and decreased, the control routine shifts to step S17, which is processed in the push force reduction control portion 33a, and one count is added to the counter for counting the number of passed clutch tooth grooves 23d1.

Following step S17, step S18 is processed in the push force reduction control portion 33a so as to determine whether or not the value of the counter for counting the number of passed clutch tooth grooves 23d1 equals one. In a case where the value of the counter for counting the number of passed clutch tooth grooves 23d1 is determined as equal to one in step S18, the control routine shifts to step S19, which is processed in the push force reduction control portion 33a, and reduces the push force F of the sleeve 26 to zero load, which is the second load F2.

Reducing the push force F of the sleeve 26 to the second load F2 reduces the frictional force between the teeth portions of the sleeve 26 and the end surfaces 23c2 of the clutch rear teeth 23c1 so that the rotation speed Ns of the sleeve 26 and the rotation speed Nc1 of the first clutch ring 23 are maintained at different rotation speeds without difficulties and the sleeve 26 and the clutch tooth grooves 23d1 are brought into a state in which the phase of the sleeve 26 may be easily matched with the phase of the clutch tooth grooves 23d1. By, for example, the side surface 26a3 of the higher tooth 26a1 of the sleeve 26 and the side surface 23b3 of the clutch front tooth 23b1 making contact, the deceleration gradient ΔNs of the rotation speed Ns of the sleeve 26 rapidly drops.

In a case where the moving amount Sd of the sleeve 26 is determined that the moving amount Sd of the sleeve 26 has not increased and decreased in step S16 and in a case where the value of the counter for counting the number of passed clutch tooth grooves 23d1 is determined as not equal to one in step S18, the sleeve 26 is either in a state where the side surface 26a3 of the higher tooth 26a1 of the sleeve 26 is already in contact with the side surface 23b3 of the clutch front tooth 23b1 or in a state where the sleeve 26 is engaged with the clutch tooth grooves 23d1 so that the control routine shifts to step S20.

Step S20, which is processed in the retry control portion 33b, determines whether or not the retry condition satisfies the condition where the deceleration gradient ΔNs of the rotation speed Ns of the sleeve 26 is larger than the predetermined threshold value ΔNs1 of the deceleration gradient ΔNs so as to re-apply the first load F1 as the push force F of the sleeve 26 at the time t5 indicated in FIG. 4.

In a state where the deceleration gradient ΔNs of the rotation speed Ns of the sleeve 26 is larger than the predetermined threshold value ΔNs1 of the deceleration gradient ΔNs, the control routine shifts to step S21, which is processed in the retry control portion 33b. In a case where the deceleration gradient ΔNs of the rotation speed Ns of the sleeve 26 is determined as not larger than the predetermined threshold value ΔNs1 of the deceleration gradient ΔNs, the sleeve 26 may be in a state where the sleeve 26 is engaged with the clutch tooth grooves 23d1, so that the control routine returns to step S14.

In step S21, which is processed in the retry control portion 33b, the sleeve 26 is re-applied with the first load F1, which is the push force F of the sleeve 26, and the control routine returns to step S14.

Figure 10:
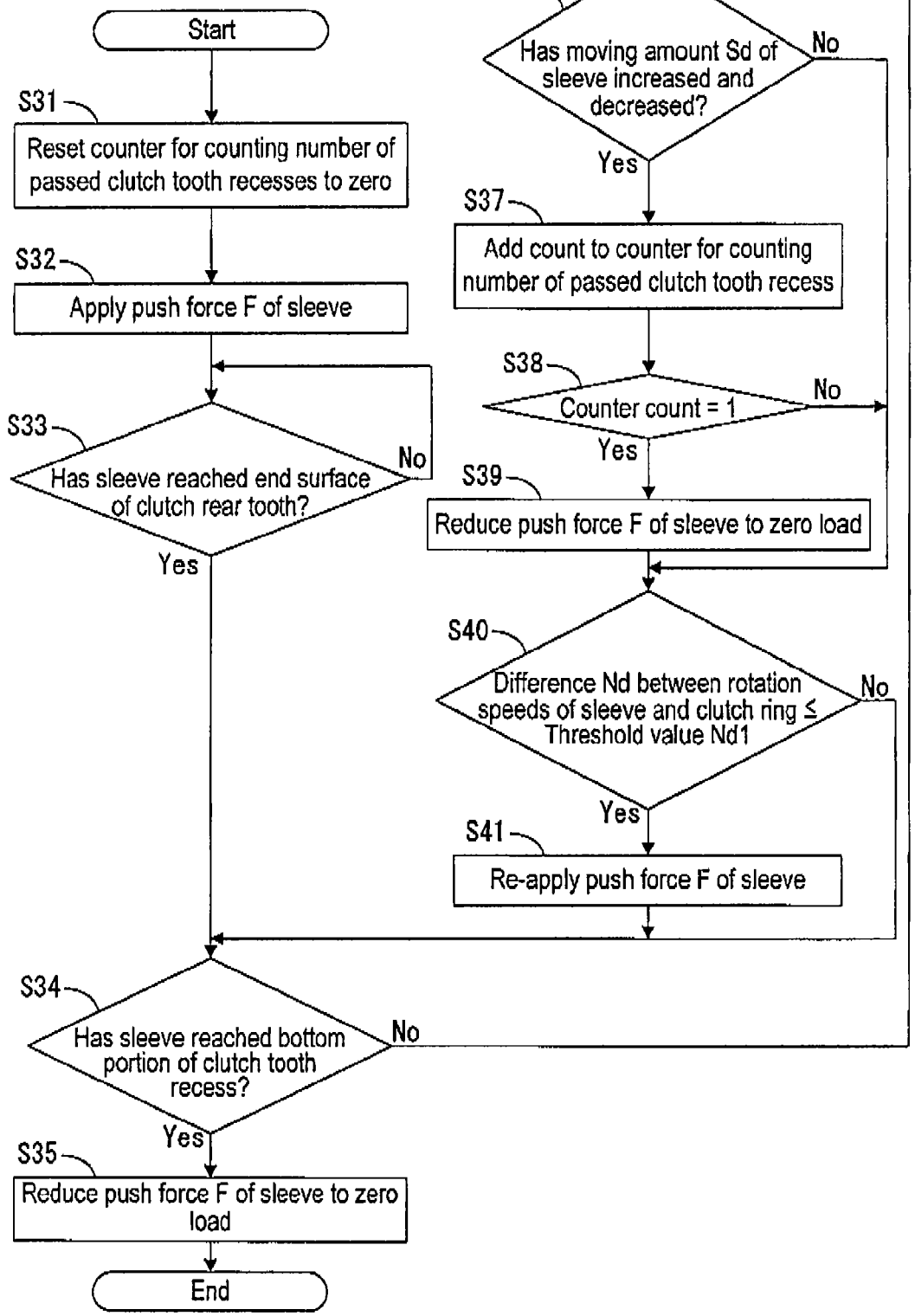
FIG. 10 is a flowchart illustrating an operation of the automatic shift device for the automated transmission for the vehicle according to a second embodiment.

The operation of the automatic shift device 10 for the automated transmission 13 for the vehicle M according to a second embodiment on an occasion where the gear stage is shifted to the gear stage established by the first clutch ring 23 and the first output gear 28a so as to increase speed will be described next referring to the flowchart illustrated in FIG. 10. The automatic shift device 10 for the automated transmission 13 for the vehicle M according to the second embodiment is identical to the automatic shift device 10 for the automated transmission 13 for the vehicle M according to the first embodiment except in the contents related to the retry control portion 33b. More specifically, step S40 in the control routine from step S31 to step S41 of the second embodiment is different from the step S20 in the control routine from step S11 to step S21 of the first embodiment. Accordingly, the descriptions different from the first embodiment will be described and the descriptions of identical portions will be omitted.

Step S40, which is processed in the retry control portion 33b, determines whether or not the retry condition satisfies the condition where a difference Nd of rotation speeds between the rotation speed Ns of the sleeve 26 and the rotation speed Nc1 of the first clutch ring 23 is equal to or less than a predetermined threshold value Nd1 for the difference Nd of rotation speeds between the rotation speed Ns of the sleeve 26 and the rotation speed Nc1 of the first clutch ring 23 so as to re-apply the first load F1 as the push force F of the sleeve 26 at the time t5 indicated in FIG. 4. In a case where the difference Nd of rotation speeds between the rotation speed Ns of the sleeve 26 and the rotation speed Nc1 of the first clutch ring 23 is equal to or less than the predetermined threshold value Nd1, the control routine shifts to step S41, which is processed in the retry control portion 33b.

In a case where the difference Nd of rotation speeds between the rotation speed Ns of the sleeve 26 and the rotation speed Nc1 of the first clutch ring 23 is determined as not equal to or less than the predetermined threshold value Nd1, the sleeve 26 may be in a state where the sleeve 26 is in a process of moving toward the clutch tooth grooves 23d1, so that the control routine returns to step S34.

Figure 11:
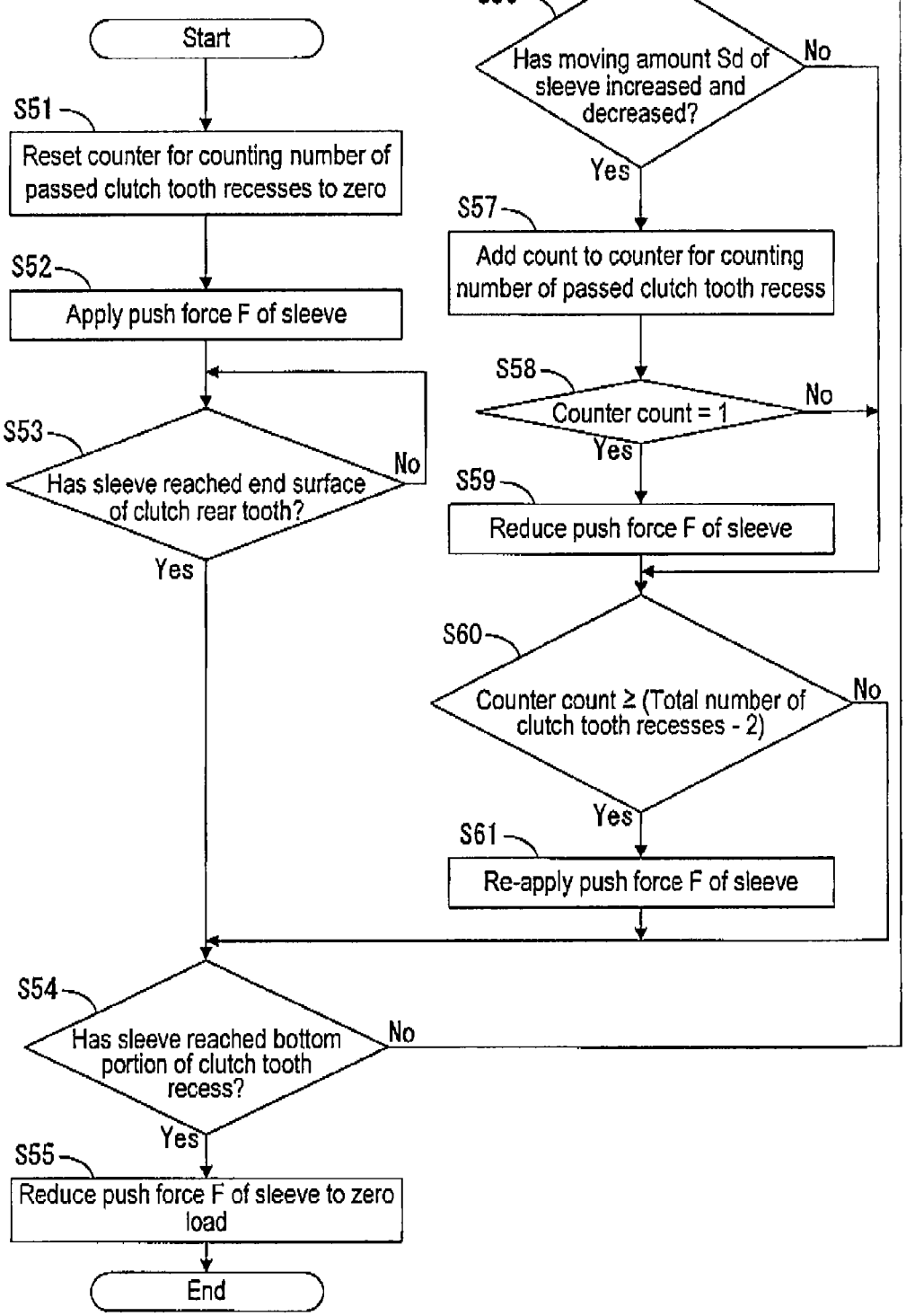
FIG. 11 is a flowchart illustrating an operation of the automatic shift device for the automated transmission for the vehicle according to a third embodiment.

The operation of the automatic shift device 10 for the automated transmission 13 for the vehicle M according to a third embodiment on an occasion where the gear stage is shifted to the gear stage established by the first clutch ring 23 and the first output gear 28a so as to increase speed will be described next referring to the flowchart illustrated in FIG. 11. The automatic shift device 10 for the automated transmission 13 for the vehicle M according to the third embodiment is identical to the automatic shift device 10 for the automated transmission 13 for the vehicle M according to the first embodiment except in the contents related to the push force reduction control portion 33a and the retry control portion 33b. More specifically, step S59 and step S60 in the control routine from step S51 to step S61 of the third embodiment are different from step S19 and step S20 in the control routine from step S11 to step S21 of the first embodiment. Accordingly, the descriptions different from the first embodiment will be described and the descriptions of identical portions will be omitted.

In step S59, which is processed in the push force reduction control portion 33a, the push force F of the sleeve 26 is reduced to the second load F2, however, the load of the second load F2 is not zero. Instead, the second load F2 is at a load level that maintains a state where the sleeve 26 is pushed on the clutch rear tooth 23c1. The second load F2 is not reduced to zero load so as to maintain a state where the back and forth movements of the sleeve 26 continue to occur, so as to detect the moving amount Sd of the sleeve 26 on passing over the clutch tooth grooves 23d1 without difficulties. The back and forth movement of the sleeve 26 is a behavior of the sleeve 26 that occurs at the time at which the sleeve 26 passes over the clutch tooth groove 23d1 that resists entry of the sleeve 26. The sleeve 26 bounces off at such clutch tooth groove 23d1 and moves away from the clutch rear teeth 23c1 at once and then moves again toward the clutch rear teeth 23c1.

Step S60, which is followed by step S59 and processed in the retry control portion 33b, determines whether or not the retry condition satisfies the condition where the count of number of times that the clutch tooth grooves 23d1 at positions between the two clutch front teeth 23b1 are passed by the higher tooth 26a1 of the sleeve 26 is equal to or more than the number of the clutch tooth grooves 23d1 minus two. In a state where the count of number of times that the clutch tooth grooves 23d1 at positions between the two clutch front teeth 23b1 are passed by the higher tooth 26a1 of the sleeve 26 is equal to or more than the number of the clutch tooth grooves 23d1 at positions between the two clutch front teeth 23b1 minus two, the control routine shifts to step 61, which is processed in the retry control portion 33b.

In a state where the count of number of times that the clutch tooth grooves 23d1 at positions between the two clutch front teeth 23b1 are passed by the higher tooth 26a1 of the sleeve 26 is not determined as a number equal to or more than the number of the clutch tooth grooves 23d1 at positions between the two clutch front teeth 23b1 minus two, the sleeve 26 may be in a state where the side surface 26a3 of the higher tooth 26a1 of the sleeve 26 is already in contact with the side surface 23b3 of the clutch front tooth 23b1, or in a state where the sleeve 26 may be already engaged with the clutch tooth grooves 23d1, or in a state where the sleeve 26 may be in a process of moving toward the clutch tooth grooves 23d1, so that the control routine returns to step S54.

The automatic shift device 10 for the automated transmission 13 for the vehicle M according to each of the first, the second, and the third embodiments includes, a rotation shaft (the input shaft 22, the output shaft 28) configured to be in rotary engagement with and axially supported to be rotatable about an axis of one of the input shaft 22 and the output shaft 28 of the automated transmission 13, a clutch ring (the first clutch ring 23, the second clutch ring 24) axially supported to be rotatable about the rotation shaft (the input shaft 22, the output shaft 28) and configured to be in rotary engagement with the other one of the input shaft 22 and the output shaft 28, the clutch hub 25 fixed on the rotation shaft (the input shaft 22, the output shaft 28) at a position adjacent to the clutch ring (the first clutch ring 23, the second clutch ring 24), the sleeve 26 fitted to the clutch hub 25 to be movable in the axial direction of the rotation shaft, a dog clutch portion (the first dog clutch portion 23a, the second dog clutch portion 24a) protrudingly arranged on the clutch ring (the first clutch ring 23, the second clutch ring 24) to protrude toward the sleeve 26, the dog clutch portion (the first dog clutch portion 23a, the second dog clutch portion 24a) selectively meshing with the sleeve 26 in response to movement of the sleeve 26 in the axial direction, the shaft moving apparatus 27 moving the sleeve 26 in the axial direction for pushing the sleeve 26 on the dog clutch portion (the first dog clutch portion 23a, the second dog clutch portion 24a), and the control portion 33 controlling an operation of the shaft moving apparatus 27 to selectively engage the sleeve 26 and the dog clutch portion (the first dog clutch portion 23a, the second dog clutch portion 24a). The spline 26a includes a multiple number of lower teeth 26b1 and a multiple number of higher teeth 26a1 formed with teeth that are taller than the lower teeth 26b1. The dog clutch portion (the first dog clutch portion 23a, the second dog clutch portion 24a) includes same number of clutch front teeth 23b1 as the number of the higher teeth 26a1. The clutch front teeth 23b1 are formed at positions corresponding to the higher teeth 26a1 and are extending in the axial direction. The clutch front teeth 23b1 are formed with the outer diameter larger than the inner diameter of the higher teeth 26a1 and smaller than the inner diameter of the lower teeth 26b1. The dog clutch portion (the first dog clutch portion 23a, the second dog clutch portion 24a) includes a multiple number of clutch rear teeth 23c1 formed at positions between the clutch front teeth 23b1, the positions recessed from the clutch front teeth by a predetermined amount, and extending in the axial direction. The dog clutch portion (the first dog clutch portion 23a, the second dog clutch portion 24a) includes clutch tooth grooves 23d1, which are engageable with the sleeve 26, formed between adjacently positioned clutch front tooth 23b1 and the clutch rear tooth 23c1 and between adjacently positioned clutch rear teeth 23c1. The control portion 33 includes the push force reduction control portion 33a performing the push force reduction control reducing the push force F of the sleeve 26 that the shaft moving apparatus 27 applies on the clutch rear teeth 23c1 in response to the back and forth movement of the sleeve 26 after the sleeve 26 reaches the end surface 23c2 of the clutch rear tooth 23c1. The control portion 33 includes the retry control portion 33b performing the retry control that re-applies the push force F of the sleeve 26 in response to a predetermined retry condition after the push force reduction control is performed. Accordingly, the automatic shift device 10 for the automated transmission 13 for the vehicle M according to each of the first, the second, and the third embodiments determines that the sleeve 26 is not engaged with a gear, or not engaged with the clutch tooth grooves 23d1, and determines to reduce the push force F of the sleeve 26 by detecting an occurrence of the back and forth movement of the sleeve 26 after the sleeve 26 reaches the end surface 23c2 of the clutch rear tooth 23c1. In other words, the automatic shift device 10 for the automated transmission 13 for the vehicle M according to each of the first, the second, and the third embodiments determines that the sleeve 26 is unable to engage with the clutch tooth grooves 23d1 beforehand by a behavior of the sleeve 26 in response to the movement of the sleeve 26 and determines that the sleeve 26 is unable to engage with the clutch tooth grooves 23d1 without waiting for an elapse of a predetermined estimated time required for the sleeve 26 to move by a predetermined amount, which is the amount that the sleeve 26 moves in order for the sleeve 26 to completely engage with the clutch tooth grooves 23d1, so that a shift time may be reduced. Positions at which the sleeve 26 begins an entry process for entering into the clutch tooth grooves 23d1 vary. In a case where the sleeve 26 is at the position that is not engageable with the clutch tooth grooves 23d1 and the sleeve 26 makes contact with the end surface 23c2 of the clutch rear tooth 23c1, the rotation speed Ns of the sleeve 26 slowly decreases and the sleeve 26 moves in the circumferential direction while being pushed on the end surface 23c2 of the clutch rear tooth 23c1. The back and forth movement of the sleeve 26 is a behavior of the sleeve 26 that occurs at the time at which the sleeve 26 passes over the clutch tooth groove 23d1 that resists entry of the sleeve 26. The sleeve 26 bounces off at such clutch tooth groove 23d1 and moves away from the clutch rear teeth 23c1 at once and then the sleeve 26 moves again toward the clutch rear teeth 23c1. The automatic shift device 10 for the automated transmission 13 for the vehicle M according to each of the first, the second and the third embodiments detects the back and forth movement of the sleeve 26 after the sleeve 26 reaches end surface 23c2 of the clutch rear tooth 23c1 in order to determine that the sleeve 26 is unable to engage with the clutch tooth grooves 23d1 beforehand. By determining that the sleeve 26 is unable to engage with the clutch tooth grooves 23d1 at the time at which the back and forth movement of the sleeve 26 is detected for the first time after the sleeve 26 reaches the end surface 23c2 of the clutch rear tooth 23c1, the automatic shift device 10 for the automated transmission 13 for the vehicle M according to each of the first, the second and the third embodiments determines beforehand that the sleeve 26 is unable to engage with the clutch tooth grooves 23d1 at an earlier point in time.

The automatic shift device 10 for the automated transmission 13 for the vehicle M according to each of the first, the second and the third embodiments further includes the stroke sensor 29 detecting the moving amount Sd of the sleeve 26 in the axial direction. The sleeve 26 is detected of the back and forth movement by changes in the output from the stroke sensor 29. The stroke sensor 29 may be shared with a stroke sensor for use in controlling the operation of the shaft moving apparatus 27 for avoiding complication of the configuration of the automatic shift device 10 for the automated transmission 13 for the vehicle M.

The automatic shift device 10 for the automated transmission 13 for the vehicle M according to the first embodiment includes the first rotation speed sensor 31 detecting the rotation speed Ns of the sleeve 26. The retry control portion 33b of the automatic shift device 10 for the automated transmission 13 for the vehicle M according to the first embodiment performs the retry control in response to the retry condition, which is the condition where the deceleration gradient $\Delta$Ns for the rotation speed Ns of the sleeve 26 is larger than the threshold value $\Delta$Ns1 of the deceleration gradient $\Delta$Ns. Accordingly, the push force F of the sleeve 26 is re-applied on the sleeve 26 in a state where the rotation speed Ns of the sleeve 26 is appropriately reduced to the rotation speed Ns appropriate for making the phase of the sleeve 26 match with the phase of the clutch tooth grooves 23d1 so as to engage the sleeve 26 with the clutch tooth grooves 23d1 without difficulties so that the retry control is effectively performed.

The automatic shift device 10 for the automated transmission 13 for the vehicle M according to the second embodiment includes the first rotation speed sensor 31 detecting the rotation speed Ns of the sleeve 26 and the second rotation speed sensor 32 detecting the rotation speed Nc1 of the first clutch ring 23. The retry control portion 33b of the automatic shift device 10 for the automated transmission 13 for the vehicle M according to the second embodiment performs the retry control in response to the retry condition, which is the condition where the difference Nd of rotation speeds between the rotation speed Ns of the sleeve 26 and the rotation speed Nc1 of the first clutch ring 23 is equal to or less than the threshold value Nd1 of the difference Nd of rotation speeds between the rotation speed Ns of the sleeve 26 and the rotation speed Nc1 of the first clutch ring 23. As a result, the rotation speed Ns of the sleeve 26 approaches the rotation speed Nc1 of the first clutch ring 23, which is the rotation speed of the clutch tooth grooves 23d1, and the push force F of the sleeve 26 is re-applied on the sleeve 26 in a state where the phase of the sleeve 26 is easily matched with the phase of the clutch tooth grooves 23d1 provided on first clutch ring 23. Accordingly, the sleeve 26 engages with the clutch tooth grooves 23d1 without difficulties so that the retry control is effectively performed.

The retry control portion 33b of the automatic shift device 10 for the automated transmission 13 for the vehicle M according to the third embodiment performs the retry control in response to the retry condition, which is the condition where the count of number of times that the clutch tooth grooves 23d1 are passed by the sleeve 26 is equal to or more than the number of the clutch tooth grooves 23d1 minus two, the count that is detected on the basis of the output from the stroke sensor 29. As a result, the push force F is re-applied on the sleeve 26 in a state where the phase of the sleeve 26 is in a state known to be easily matched with the phase of the clutch tooth grooves 23d1, which is a state where the sleeve 26 is at a phase at which at least one clutch tooth groove 23d1 remains for the sleeve 26 to pass over, the phase at which the side surface 26a3 of the higher tooth 26a1 of the sleeve 26 makes contact with the side surface 23b3 of the clutch front tooth 23b1 at the next time when the sleeve 26 passes over the clutch tooth groove 23d1 so as to establish a state where the higher tooth 26a1 of the sleeve 26 faces the clutch tooth groove 23d1 where the higher tooth 26a1 engages. Accordingly, the sleeve 26 engages with the clutch tooth grooves 23d1 without difficulties so that the retry control is effectively performed.

The automatic shift device 10 for the automated transmission 13 for the vehicle M according to each of the first and the second embodiments reduces the push force F of the sleeve 26 to zero load. By reducing the push force F of the sleeve 26 to zero load, the sleeve 26 is brought into a state where the speed of rotation of the sleeve 26 is not decreasing so that the side surface 26a3 of the higher tooth 26a1 of the sleeve 26 swiftly makes contact with the side surface 23b3 of the clutch front tooth 23b1 so as to establish a state where the higher tooth 26a1 of the sleeve 26 faces the clutch tooth groove 23d1 where the higher tooth 26a1 engages. The push force F is re-applied on the sleeve 26 in a state where the phase of the sleeve 26 is easily matched with the phase of the clutch tooth grooves 23d1, so that the sleeve 26 engages with the clutch tooth grooves 23d1 without difficulties and the retry control is effectively performed.

The push force reduction control portion 33a of the automatic shift device 10 for the automated transmission 13 for the vehicle M according to the third embodiment reduces the push force F of the sleeve 26 to a load level that maintains a state where the sleeve 26 is pushed on the end surface 23c2 of the clutch rear tooth 23c1. By reducing the push force F of the sleeve 26 to the load level that may maintain the state where the sleeve 26 is pushed on the end surface 23c2 of the clutch rear tooth 23c1, the phase between the sleeve 26 and the clutch tooth grooves 23d1 may be directly detected by the stroke sensor 29 through the behavior of the sleeve 26 even after the push force F of the sleeve is reduced.

The automatic shift device 10 for the automated transmission 13 for the vehicle M according to the third embodiment includes the first rotation speed sensor 31 detecting the rotation speed Ns of the sleeve 26, and the second rotation speed sensor 32 detecting the rotation speed Nc1 of the first clutch ring 23. The retry control portion 33b of the automatic shift device 10 for the automated transmission 13 for the vehicle M according to the third embodiment calculates the amount of time that the sleeve 26 requires to pass over the end surface 23c2 of the clutch rear tooth 23c1 on the basis of the difference Nd of rotation speeds between the rotation speed Ns of the sleeve 26 and the rotation speed Nc1 of the first clutch ring 23 and performs the retry control in response to the retry condition including a predetermined amount of time to delay the retry control defined by the calculated amount of time. Accordingly, the push force F of the sleeve 26 is re-applied on the sleeve 26 in a state where the phase of the sleeve 26 is in a state known to be easily matched with the phase of the clutch tooth grooves 23d1, which is the state where the sleeve 26 is at the phase at which the side surface 26a3 of the higher tooth 26a1 of the sleeve 26 is in contact with the side surface 23b3 of the clutch front tooth 23b1 and the sleeve 26 is in the state where the higher tooth 26a1 of the sleeve 26 is facing the clutch tooth groove 23d1 where the higher tooth 26a1 engages. As a result, the sleeve 26 engages with the clutch tooth grooves 23d1 without difficulties so that the retry control is effectively performed.

An automated transmission for the automatic shift device 10 for the automated transmission 13 for the vehicle M according to this disclosure is not limited to the type of automated transmission used in the automatic shift device 10 for the automated transmission 13 for the vehicle M according to each of the first, the second, and the third embodiments. For example, the automatic shift device 10 for the automated transmission 13 for the vehicle M according to this disclosure may be applied to an automated manual transmission (AMT), which is a manual transmission (MT) provided with a shift control being automated, and to a dual clutch transmission (DCT), which includes two clutches. An AMT is commonly known to include an input shaft, an output shaft and a counter shaft. The counter shaft, or a secondary shaft, for example, may serve as the rotation shaft in the AMT. In a DCT, similarly to an AMT, two counter shafts, or secondary shafts, may serve as the rotation shaft. Advantages obtained by the application of the automatic shift device 10 for the automated transmission 13 for the vehicle M according to each of the first, the second, and the third embodiment to the automated transmission 13 are similarly obtained by the application of the automatic shift device 10 for the automated transmission 13 for the vehicle M according to each of the first, the second, and the third embodiment to the AMT or to the DCT.

Characteristics described to describe each of the automatic shift device 10 for the automated transmission 13 for the vehicle M according to the first, the second, the third, and the alternative embodiments may be appropriately combined to form another embodiment unless the characteristic is specifically described as the characteristic unique to a specific embodiment.

According to an aspect of this disclosure, an automatic shift device 10 for an automated transmission 13 for a vehicle M includes a rotation shaft (an input shaft 22, an output shaft 28) configured to be in rotary engagement with and axially supported to be rotatable about an axis of one of an input shaft 22 and an output shaft 28 of the automated transmission 13, a clutch ring (a first clutch ring 23, a second clutch ring 24) axially supported to be rotatable about the rotation shaft (the input shaft 22, the output shaft 28) and configured to be in rotary engagement with the other one of the input shaft 22 and the output shaft 28, a clutch hub 25 fixed on the rotation shaft (the input shaft 22, the output shaft 28) at a position adjacent to the clutch ring (the first clutch ring 23, the second clutch ring 24), a sleeve 26 fitted to the clutch hub 25 to be movable in an axial direction of the rotation shaft (the input shaft 22, the output shaft 28), a dog clutch portion (a first dog clutch portion 23a, a second dog clutch portion 24a) protrudingly arranged on the clutch ring (the first clutch ring 23, the second clutch ring 24) to protrude toward the sleeve 26, the dog clutch portion (the first dog clutch portion 23a, the second dog clutch portion 24a) selectively meshing with the sleeve 26 in response to movement of the sleeve 26 in the axial direction, a shaft moving apparatus 27 moving the sleeve 26 in the axial direction for pushing the sleeve 26 on the dog clutch portion (the first dog clutch portion 23a, the second dog clutch portion 24a), and a control portion 33 controlling an operation of the shaft moving apparatus 27 to selectively engage the sleeve 26 and the dog clutch portion (the first dog clutch portion 23a, the second dog clutch portion 24a). The sleeve 26 includes a multiple number of lower teeth 26b1 and a multiple number of higher teeth 26a1 formed with teeth that are taller than the lower teeth 26b1. The dog clutch portion (the first dog clutch portion 23a, the second dog clutch portion 24a) includes same number of clutch front teeth 23b1 as number of the higher teeth 26a1, the clutch front teeth 23b1 formed at positions corresponding to the higher teeth 2631 and extending in the axial direction, the clutch front teeth 23b1 formed with an outer diameter larger than an inner diameter of the higher teeth 26a1 and smaller than an inner diameter of the lower teeth 26b1. The dog clutch portion (the first dog clutch portion 23a, a second dog clutch portion 24a) includes a multiple number of clutch rear teeth 23c1 formed at positions between the clutch front teeth 23b1, the positions recessed from the clutch front teeth 23b1 by a predetermined amount, and extending in the axial direction. The dog clutch portion (the first dog clutch portion 23a, the second dog clutch portion 24a) includes clutch tooth grooves 23d1 formed between adjacently positioned clutch front tooth 23b1 and the clutch rear tooth 23c1 and between adjacently positioned clutch rear teeth 23c1, the clutch tooth grooves 23d1 engageable with the sleeve 26. The control portion 33 includes a push force reduction control portion 33a performing a push force reduction control reducing a push force F of the sleeve 26 that the shaft moving apparatus 27 applies on the clutch rear teeth 23c1 in response to a back and forth movement of the sleeve 26 after the sleeve 26 reaches an end surface 23c2 of the clutch rear tooth 23c1. The control portion 33 includes a retry control portion 33b performing a retry control that re-applies the push force F of the sleeve 26 in response to a predetermined retry condition after the push force reduction control is performed.

Accordingly, the automatic shift device 10 for the automated transmission 13 for the vehicle M according to this disclosure determines that the sleeve 26 is not engaged with a gear, or not engaged with the clutch tooth grooves 23d1, and determines to reduce the push force F of the sleeve 26 by detecting an occurrence of the back and forth movement of the sleeve 26 after the sleeve 26 reaches the end surface 23c2 of the clutch rear tooth 23c1. In other words, the automatic shift device 10 for the automated transmission 13 for the vehicle M according to this disclosure determines that the sleeve 26 is unable to engage with the clutch tooth grooves 23d1 beforehand by a behavior of the sleeve 26 in response to the movement of the sleeve 26 and determines that the sleeve 26 is unable to engage with the clutch tooth grooves 23d1 without waiting for an elapse of a predetermined estimated time required for the sleeve 26 to move by a predetermined amount, which is the amount that the sleeve 26 moves in order for the sleeve 26 to completely engage with the clutch tooth grooves 23d1, so that a shift time may be reduced. Positions at which the sleeve 26 begins an entry process for entering into the clutch tooth grooves 23d1 vary. In a case where the sleeve 26 is at the position not engageable with the clutch tooth grooves 23d1 and the sleeve 26 makes contact with the end surface 23c2 of the clutch rear tooth 23c1, the rotation speed Ns of the sleeve 26 slowly decreases and the sleeve 26 moves in a circumferential direction while being pushed on the end surface 23c2 of the clutch rear tooth 23c1. The back and forth movement of the sleeve 26 is a behavior of the sleeve 26 that occurs at a time at which the sleeve 26 passes over the clutch tooth groove 23d1 that resists entry of the sleeve 26. The sleeve 26 bounces off at such clutch tooth groove 23d1 and moves away from the clutch rear teeth 23c1 at once and then the sleeve 26 moves again toward the clutch rear teeth 23c1. The automatic shift device 10 for the automated transmission 13 for the vehicle M according to this disclosure detects the back and forth movement of the sleeve 26 after the sleeve 26 reaches the end surface 23c2 of the clutch rear tooth 23c1 in order to determine that the sleeve 26 is unable to engage with the clutch tooth grooves 23d1 beforehand. By determining that the sleeve 26 is unable to engage with the clutch tooth grooves 23d1 at the time at which the back and forth movement of the sleeve 26 is detected for the first time after the sleeve 26 reaches the end surface 23c2 of the clutch rear tooth 23c1, the automatic shift device 10 for the automated transmission 13 for the vehicle M according to this disclosure determines beforehand that the sleeve 26 is unable to engage with the clutch tooth grooves 23d1 at an earlier point in time.

According to another aspect of this disclosure, the automatic shift device 10 for the automated transmission 13 for the vehicle M further includes a stroke sensor 29 detecting a moving amount Sd of the sleeve 26 in the axial direction. The sleeve 26 of the automatic shift device 10 for the automated transmission 13 for the vehicle M is detected of the back and forth movement by changes in an output from the stroke sensor 29.

Accordingly, the back and forth movement of the sleeve 26 is detected by changes in the output from the stroke sensor 29 that detects the moving amount Sd of the sleeve 26 in the axial direction. The stroke sensor 29 may be shared with a stroke sensor for use in controlling the operation of the shaft moving apparatus 27 for avoiding complication of the configuration of the automatic shift device 10 for the automated transmission 13 for the vehicle M.

According to further aspect of this disclosure, the automatic shift device 10 for the automated transmission 13 for the vehicle M further includes a first rotation speed sensor 31 detecting a rotation speed Ns of the sleeve 26. The retry control portion 33b of the automatic shift device 10 for the automated transmission 13 for the vehicle M performs the retry control in response to the retry condition, the retry condition where a deceleration gradient $\Delta$Ns of the rotation speed Ns of the sleeve 26 is larger than a threshold value $\Delta$Ns1 of the deceleration gradient $\Delta$Ns.

Accordingly, the retry control portion 33b performs the retry control in response to the retry condition, which is the condition where the deceleration gradient $\Delta$Ns of the rotation speed Ns of the sleeve 26 is larger than the threshold value $\Delta$Ns1 of the deceleration gradient $\Delta$Ns. As a result, the push force F of the sleeve 26 is re-applied on the sleeve 26 in a state where the rotation speed Ns of the sleeve 26 is appropriately reduced to the rotation speed Ns appropriate for making the phase of the sleeve 26 match with the phase of the clutch tooth grooves 23d1 so as to engage the sleeve 26 with the clutch tooth grooves 23d1 without difficulties so that the retry control is effectively performed.

According to another aspect of this disclosure, the automatic shift device 10 for the automated transmission 13 for the vehicle M further includes the first rotation speed sensor 31 detecting the rotation speed Ns of the sleeve 26 and a second rotation speed sensor 32 detecting a rotation speed Nc1 of the clutch ring (the first clutch ring 23, the second clutch ring 24). The retry control portion 33b of the automatic shift device 10 for the automated transmission 13 for the vehicle M performs the retry control in response to the retry condition, the retry condition where a difference Nd of rotation speeds between the rotation speed Ns of the sleeve 26 and the rotation speed Nc1 of the clutch ring (the first clutch ring 23, the second clutch ring 24) is equal to or less than a threshold value Nd1 of the difference Nd of rotation speeds between the rotation speed Ns of the sleeve 26 and the rotation speed Nc1 of the clutch ring (the first clutch ring 23, the second clutch ring 24).

Accordingly, the retry control portion 33b performs the retry control in response to the retry condition, which is the condition where the difference Nd of rotation speeds between the rotation speed Ns of the sleeve 26 and the rotation speed Nc1 of the clutch ring (the first clutch ring 23, the second clutch ring 24) is equal to or less than the threshold value Nd1 of the difference Nd of rotation speeds between the rotation speed Ns of the sleeve 26 and the rotation speed Nc1 of the clutch ring (the first clutch ring 23, the second clutch ring 24). As a result, the rotation speed Ns of the sleeve 26 approaches the rotation speed Nc1 of the clutch ring (the first clutch ring 23, the second clutch ring 24), which is the rotation speed of the clutch tooth grooves 23d1, and the push force F of the sleeve 26 is re-applied on the sleeve 26 in a state where the phase of the sleeve 26 is easily matched with the phase of the clutch tooth grooves 23d1 provided on the clutch ring (the first clutch ring 23, the second clutch ring 24). Accordingly, the sleeve 26 engages with the clutch tooth grooves 23d1 without difficulties so that the retry control is effectively performed.

According to further aspect of this disclosure, the retry control portion 33b of the automatic shift device 10 for the automated transmission 13 for the vehicle M performs the retry control in response to the retry condition, the retry condition where a count of number of times that the clutch tooth grooves 23d1 are passed by the sleeve 26 is equal to or more than number of the clutch tooth grooves 23d1 minus two, the count detected on the basis of an output from the stroke sensor 29.

Accordingly, the retry control portion 33b performs the retry control in response to the retry condition, which is the condition where the count of number of times that the clutch tooth grooves 23d1 are passed by the sleeve 26 is equal to or more than the number of the clutch tooth grooves minus two, the count that is detected on the basis of the output from the stroke sensor 29. As a result, the push force F is re-applied on the sleeve 26 in a state where the phase of the sleeve 26 is in a state known to be easily matched with the phase of the clutch tooth grooves 23d1, which is a state where the sleeve 26 is at a phase at which at least one clutch tooth groove 23d1 remains for the sleeve 26 to pass over, the phase at which the side surface 26a3 of the higher tooth 26a1 of the sleeve 26 makes contact with the side surface 23b3 of the clutch front tooth 23b1 at the next time when the sleeve 26 passes over the clutch tooth groove 23d1 so as to establish a state where the higher tooth 26a1 of the sleeve 26 faces the clutch tooth groove 23d1 where the higher tooth 26a1 engages. Accordingly, the sleeve 26 engages with the clutch tooth grooves 23d1 without difficulties so that the retry control is effectively performed.

According to another aspect of this disclosure, the push force reduction control portion 33a of the automatic shift device 10 for the automated transmission 13 for the vehicle M reduces the push force F of the sleeve 26 to zero load.

By reducing the push force F of the sleeve 26 to zero load, the sleeve 26 is brought into a state where the speed of rotation of the sleeve 26 is not decreasing, so that the side surface 26a3 of the higher tooth 26a1 of the sleeve 26 swiftly makes contact with the side surface 23b3 of the clutch front tooth 23b1 so as to establish a state where the higher tooth 26a1 of the sleeve 26 faces the clutch tooth groove 23d1 where the higher tooth 26a1 engages. The push force F is re-applied on the sleeve 26 in a state where the phase of the sleeve 26 is easily matched with the phase of the clutch tooth grooves 23d1, so that the sleeve 26 engages with the clutch tooth grooves 23d1 without difficulties and the retry control is effectively performed.

According to further aspect of this disclosure, the push force reduction control portion 33a of the automatic shift device 10 for the automated transmission 13 for the vehicle M reduces the push force F of the sleeve 26 to a load level that maintains a state where the sleeve 26 is pushed on the end surface 23c2 of the clutch rear tooth 23c1.

By reducing the push force F of the sleeve 26 to the load level that may maintain the state where the sleeve 26 is pushed on the end surface 23c2 of the clutch rear tooth 23c1, the phase between the sleeve 26 and the clutch tooth grooves 23d1 may be directly detected by the stroke sensor 29 through the behavior of the sleeve 26 even after the push force F of the sleeve is reduced.

According to another aspect of this disclosure, the automatic shift device 10 for the automated transmission 13 for the vehicle M further includes the first rotation speed sensor 31 detecting the rotation speed Ns of the sleeve 26 and the second rotation speed sensor 32 detecting the rotation speed Nc1 of the clutch ring (the first clutch ring 23, the second clutch ring 24). The retry control portion 33b of the automatic shift device 10 for the automated transmission 13 for the vehicle M calculates an amount of time that the sleeve 26 requires to pass over the end surface 23c2 of the clutch rear tooth 23c1 on the basis of the difference Nd of rotation speeds between the rotation speed Ns of the sleeve 26 and the rotation speed Nc1 of the clutch ring (the first clutch ring 23, the second clutch ring 24). The retry control portion 33b performs the retry control in response to the retry condition including a predetermined amount of time to delay the retry control defined by the calculated amount of time.

The retry control portion 33b calculates the amount of time that the sleeve 26 requires to pass over the end surface 23c2 of the clutch rear tooth 23c1 on the basis of the difference Nd of rotation speeds between the rotation speed Ns of the sleeve 26 and the rotation speed Nc1 of the clutch ring (the first clutch ring 23, the second clutch ring 24). Further, the retry control portion 33b performs the retry control in response to the retry condition including the predetermined amount of time to delay the retry control defined by the calculated amount of time. Accordingly, the push force F of the sleeve 26 is re-applied on the sleeve 26 in a state where the phase of the sleeve 26 is in a state known to be easily matched with the phase of the clutch tooth grooves 23d1, which is the state where the sleeve 26 is at the phase at which the side surface 26a3 of the higher tooth 26a1 of the sleeve 26 is in contact with the side surface 23b3 of the clutch front tooth 23b1 and the sleeve 26 is in the state where the higher tooth 26a1 of the sleeve 26 is facing the clutch tooth groove 23d1 where the higher tooth 26a1 engages. As a result, the sleeve 26 engages with the clutch tooth grooves 23d1 without difficulties so that the retry control is effectively performed.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An automatic shift device for an automated transmission for a vehicle, comprising:
    a rotation shaft configured to be in rotary engagement with and axially supported to be rotatable about an axis of one of an input shaft and an output shaft of the automated transmission;
    a clutch ring axially supported to be rotatable about the rotation shaft and configured to be in rotary engagement with the other one of the input shaft and the output shaft;
    a clutch hub fixed on the rotation shaft at a position adjacent to the clutch ring;
    a sleeve fitted to the clutch hub to be movable in an axial direction of the rotation shaft;
    a dog clutch portion protrudingly arranged on the clutch ring to protrude toward the sleeve, the dog clutch portion selectively meshing with the sleeve in response to movement of the sleeve in the axial direction;
    a shaft moving apparatus moving the sleeve in the axial direction for pushing the sleeve on the dog clutch portion; and
    a control portion controlling an operation of the shaft moving apparatus to selectively engage the sleeve and the dog clutch portion, wherein
    the sleeve includes plural lower teeth and plural higher teeth formed with teeth that are taller than the lower teeth, wherein
    the dog clutch portion includes same number of clutch front teeth as number of the higher teeth, the clutch front teeth formed at positions corresponding to the higher teeth and extending in the axial direction, the clutch front teeth formed with an outer diameter larger than an inner diameter of the higher teeth and smaller than an inner diameter of the lower teeth, wherein the dog clutch portion includes plural clutch rear teeth formed at positions between the clutch front teeth, the positions recessed from the clutch front teeth by a predetermined amount, and extending in the axial direction, wherein the dog clutch portion includes clutch tooth grooves formed between adjacently positioned clutch front tooth and the clutch rear tooth and between adjacently positioned clutch rear teeth, the clutch tooth grooves engageable with the sleeve, wherein
    the control portion includes a push force reduction control portion performing a push force reduction control reducing a push force of the sleeve that the shaft moving apparatus applies on the clutch rear teeth in response to a back and forth movement of the sleeve after the sleeve reaches an end surface of the clutch rear tooth, wherein the control portion includes a retry control portion performing a retry control that re-applies the push force of the sleeve in response to a predetermined retry condition after the push force reduction control is performed.

2. The automatic shift device for the automated transmission for the vehicle according to claim 1, further comprising:
    a stroke sensor detecting a moving amount of the sleeve in the axial direction, wherein the sleeve is detected of the back and forth movement by changes in an output from the stroke sensor.

3. The automatic shift device for the automated transmission for the vehicle according to claim 1, further comprising:
a first rotation speed sensor detecting a rotation speed of the sleeve, wherein
the retry control portion performs the retry control in response to the retry condition, the retry condition where a deceleration gradient of the rotation speed of the sleeve is larger than a threshold value of the deceleration gradient.

4. The automatic shift device for the automated transmission for the vehicle according to claim 1, further comprising:
a first rotation speed sensor detecting a rotation speed of the sleeve; and
a second rotation speed sensor detecting a rotation speed of the clutch ring, wherein
the retry control portion performs the retry control in response to the retry condition, the retry condition where a difference of rotation speeds between the rotation speed of the sleeve and the rotation speed of the clutch ring is equal to or less than a threshold value of the difference of rotation speeds between the rotation speed of the sleeve and the rotation speed of the clutch ring.

5. The automatic shift device for the automated transmission for the vehicle according to claim 1, wherein the retry control portion performs the retry control in response to the retry condition, the retry condition where a count of number of times that the clutch tooth grooves are passed by the sleeve is equal to or more than number of the clutch tooth grooves minus two, the count detected on the basis of an output from a stroke sensor.

6. The automatic shift device for the automated transmission for the vehicle according to claim 1, wherein the push force reduction control portion reduces the push force of the sleeve to zero load.

7. The automatic shift device for the automated transmission for the vehicle according to claim 5, wherein the push force reduction control portion reduces the push force of the sleeve to a load level that maintains a state where the sleeve is pushed on the end surface of the clutch rear tooth.

8. The automatic shift device for the automated transmission for the vehicle according to claim 5 further comprising:
a first rotation speed sensor detecting a rotation speed of the sleeve; and
a second rotation speed sensor detecting a rotation speed of the clutch ring, wherein
the retry control portion calculates an amount of time that the sleeve requires to pass over the end surface of the clutch rear tooth on the basis of a difference of rotation speeds between the rotation speed of the sleeve and the rotation speed of the clutch ring, wherein the retry control portion performs the retry control in response to the retry condition including a predetermined amount of time to delay the retry control defined by the calculated amount of time.

9. The automatic shift device for the automated transmission for the vehicle according to claim 2, wherein the retry control portion performs the retry control in response to the retry condition, the retry condition where a count of number of times that the clutch tooth grooves are passed by the sleeve is equal to or more than number of the clutch tooth grooves minus two, the count detected on the basis of an output of the stroke sensor.

10. The automatic shift device for the automated transmission for the vehicle according to claim 2, wherein the push force reduction control portion reduces the push force of the sleeve to zero load.

11. The automatic shift device for the automated transmission for the vehicle according to claim 3, wherein the push force reduction control portion reduces the push force of the sleeve to zero load.

12. The automatic shift device for the automated transmission for the vehicle according to claim 4, wherein the push force reduction control portion reduces the push force of the sleeve to zero load.

13. The automatic shift device for the automated transmission for the vehicle according to claim 7 further comprising:
a first rotation speed sensor detecting a rotation speed of the sleeve; and
a second rotation speed sensor detecting a rotation speed of the clutch ring, wherein
the retry control portion calculates an amount of time that the sleeve requires to pass over the end surface of the clutch rear tooth on the basis of a difference of rotation speeds between the rotation speed of the sleeve and the rotation speed of the clutch ring, wherein the retry control portion performs the retry control in response to the retry condition including a predetermined amount of time to delay the retry control defined by the calculated amount of time.

* * * * *